(12) United States Patent
Morita

(10) Patent No.: US 9,166,449 B2
(45) Date of Patent: Oct. 20, 2015

(54) ROTOR AND MOTOR

(71) Applicant: ASMO CO., LTD., Shizuoka-ken (JP)

(72) Inventor: Chie Morita, Kosai (JP)

(73) Assignee: Asmo Co., Ltd., Shizuoka-ken (JP)

( * ) Notice: Subject to any disclaimer, the term of this patent is extended or adjusted under 35 U.S.C. 154(b) by 295 days.

(21) Appl. No.: 13/761,741

(22) Filed: Feb. 7, 2013

(65) Prior Publication Data

US 2013/0207502 A1 Aug. 15, 2013

(30) Foreign Application Priority Data

Feb. 15, 2012 (JP) ................................. 2012-030750
Feb. 15, 2012 (JP) ................................. 2012-030751
Mar. 30, 2012 (JP) ................................. 2012-080031

(51) Int. Cl.
*H02K 21/12* (2006.01)
*H02K 1/27* (2006.01)

(52) U.S. Cl.
CPC ................. *H02K 1/27* (2013.01); *H02K 1/2713* (2013.01)

(58) Field of Classification Search
CPC ................................. H02K 1/27; H02K 1/2713
USPC .................... 310/156.66, 156.68, 156.69, 263
See application file for complete search history.

(56) References Cited

U.S. PATENT DOCUMENTS

| 4,388,545 A | 6/1983 | Honsinger et al. | |
| 5,854,526 A | 12/1998 | Sakamoto | |
| 6,307,297 B1 * | 10/2001 | Bramson et al. | ............... 310/263 |
| 6,426,581 B1 * | 7/2002 | York et al. | ..................... 310/263 |
| 8,324,780 B2 * | 12/2012 | Inoue et al. | ............... 310/156.72 |
| 2008/0315700 A1 * | 12/2008 | Ishikawa et al. | .......... 310/156.66 |
| 2010/0096941 A1 * | 4/2010 | Inoue et al. | .................. 310/181 |
| 2010/0164317 A1 | 7/2010 | Inoue et al. | |
| 2012/0056502 A1 | 3/2012 | Cai et al. | |

FOREIGN PATENT DOCUMENTS

| JP | 63-077362 A | 4/1988 |
| JP | H0449836 | 2/1992 |
| JP | 5-43749 | 6/1993 |
| JP | H06178474 | 6/1994 |
| JP | 2000-209825 A | 7/2000 |
| JP | 2013-046508 A | 3/2013 |
| WO | 2007/043161 | 4/2007 |
| WO | 2010/127469 A1 | 11/2010 |
| WO | 2012067223 A1 | 5/2012 |

* cited by examiner

*Primary Examiner* — Thanh Lam
(74) *Attorney, Agent, or Firm* — Caesar, Rivise, PC

(57) ABSTRACT

A rotor includes a field member arranged between a first core base of a first rotor core and a second core base of a second rotor core in the axial direction. When magnetized in the axial direction, the field member causes primary claw-shaped magnetic poles to function as primary magnetic poles and secondary claw-shaped magnetic poles to function as secondary magnetic poles. The field member is formed by placing a plurality of members one over another in the axial direction.

5 Claims, 16 Drawing Sheets

ROTOR AND MOTOR

BACKGROUND

The present disclosure relates a rotor and a motor.

A rotor used in a motor disclosed in Japanese Laid-Open Utility Model Publication H05-43749 is a rotor having a Lundell-type structure and includes a pair of rotor cores each having a plurality of claw-shaped magnetic poles in a circumferential direction and assembled with each other. By arranging a field magnet as a disc magnet between the rotor cores, the respective claw-shaped magnetic poles are caused to function as alternately different magnetic poles.

A Lundell-type rotor structure has an advantage of being able to easily achieve multipolarity by a simple structure due to the formation of the magnetic poles on the claw-shaped magnetic poles by the disc magnet between the rotor cores.

In the Lundell-type rotor structure, the claw-shaped magnetic poles have a three-dimensional shape radially protruding outward from a core base and axially extending from a radially outer end. Thus, unlike rotors of general technology in which a cross-sectional shape in a direction perpendicular to an axis is the same at all positions, Lundell-type rotors cannot easily adjust an output characteristic and the shape of the claw-shaped magnetic poles is changed for each target characteristic. This leads to a cost increase.

Further, an output characteristic of the Lundell-type rotor structure is affected by main magnetic flux generated from the disc magnet between the rotor cores. Thus, it is desired that the shape of the rotor more be made suitable for achieving a higher motor output.

Further, in the Lundell-type rotor, the number of components tends to be large. Associated with this, there has been a problem that the number of assembling steps increases.

SUMMARY

An objective of the present disclosure is to provide a rotor that easily enables an output adjustment and a reduction in the number of components without changing the shape thereof, and a motor including such a rotor.

In accordance with one aspect of the present disclosure, a rotor is provided that includes a first rotor core, a second rotor core, and a field member. The first rotor core includes a substantially disk-shaped first core base and a plurality of primary claw-shaped magnetic poles formed at equal intervals on an outer peripheral part of the first core base. The primary claw-shaped magnetic poles protrude radially outward and extending in an axial direction. The second rotor core includes a substantially disk-shaped second core base and a plurality of secondary claw-shaped magnetic poles formed at equal intervals on an outer peripheral part of the second core base. The secondary claw-shaped magnetic poles protrude radially outward and extend in the axial direction. Each secondary claw-shaped magnetic pole is arranged between corresponding primary claw-shaped magnetic poles. The field member is arranged between the first core base and the second core base in the axial direction. When magnetized in the axial direction, the field member causes the primary claw-shaped magnetic poles to function as primary magnetic poles and the secondary claw-shaped magnetic poles to function as secondary magnetic poles. The field member is formed by placing a plurality of members one over another in the axial direction.

According to this aspect, an output is easily adjusted without changing the shape of the rotor by placing the members one over another in the axial direction to form the field member.

In accordance with one form of the present disclosure, the field member comprises of a plurality of permanent magnets.

According to this aspect, an output is easily adjusted without changing the shape of the rotor by placing the permanent magnets one over another in the axial direction to form the field member.

In accordance with one form of the present disclosure, the field member comprises a permanent magnet and a magnetic member.

According to this aspect, an output is easily adjusted without changing the shape of the rotor by placing the permanent magnet and the magnetic member one over the other in the axial direction to form the field member.

In accordance with one form of the present disclosure, the field member is formed by arranging a magnetic member between a plurality of permanent magnets.

According to this aspect, an output is easily adjusted without changing the shape of the rotor by arranging the magnetic member between the permanent magnets and placing the permanent magnets and the magnetic member one over another in the axial direction to form the field member.

The present disclosure also provides a motor including the above described rotor.

According to this aspect, a motor is realized of which the output is easily adjusted without changing the shape of the rotor.

In accordance with another aspect of the present disclosure, a rotor is provided that includes a first rotor core, a second rotor core, and a field member. The first rotor core includes a substantially disk-shaped first core base and a plurality of primary claw-shaped magnetic poles formed at equal intervals on an outer peripheral part of the first core base. The primary claw-shaped magnetic poles protrude radially outward and extending in an axial direction. The second rotor core includes a substantially disk-shaped second core base and a plurality of secondary claw-shaped magnetic poles formed at equal intervals on an outer peripheral part of the second core base. The secondary claw-shaped magnetic poles protrude radially outward and extend in the axial direction. Each secondary claw-shaped magnetic pole is arranged between corresponding primary claw-shaped magnetic poles. The field member is arranged between the first core base and the second core base in the axial direction. When magnetized in the axial direction, the field member causes the primary claw-shaped magnetic poles to function as primary magnetic poles and the secondary claw-shaped, magnetic poles to function as secondary magnetic poles. A surface that is not perpendicular to the direction of magnetization is formed on at least one of axial end surfaces of the field member.

According to this aspect, the surface area of contact surfaces of the field member held in contact with the first core base and the second core base is increased in the field member arranged between the first rotor core and the second rotor core. Thus, magnetic flux densities from the field member to the first core base and the second core base are increased and a higher output of a motor is achieved.

In accordance with one form of the present disclosure, a tapered surface is formed on a part of the axial end surface of the field member.

According to this aspect, the surface area of the contact surfaces of the field member held in contact with the first core base and the second core base is increased and magnetic flux densities for the first core base and the second core base are increased by forming the tapered surface on at least the part of the axial end surface of the field member. A higher output of a motor is achieved.

In accordance with one form of the present disclosure, a bellows-like corrugated surface is formed on the axial end surface of the field member.

According to this aspect, the surface area of the contact surfaces of the field member held in contact with the first core base and the second core base is increased by forming the bellows-like corrugated surface on the axial end surface of the field member. Thus, magnetic flux densities for the first core base and the second core base are increased and a higher output of a motor is achieved.

In accordance with one form of the present disclosure, the axial end surface of the field member is held in contact with a corresponding one of a facing surface of the first core base and a facing surface of the second core base via a spacer that has a surface shape in conformity with the shape of the axial end surface of the field member and is formed of a magnetic member.

According to this aspect, the spacer increases magnetic flux densities of the field member for the first core base and the second core base without changing the shapes of the first core base and the second core base. Thus, a higher output of a motor is achieved.

In accordance with one form of the present disclosure, a motor including the above described rotor is provided.

According to this aspect, a high-output motor is realized without changing the size of the rotor.

In accordance with another aspect of the present disclosure, a rotor is provided that includes a first rotor core, a second rotor core, a field member, and auxiliary magnets. The first rotor core includes a substantially disk-shaped first core base and a plurality of primary claw-shaped magnetic poles formed at equal intervals on an outer peripheral part of the first core base. The primary claw-shaped magnetic poles protrude radially outward and extend in an axial direction. The second rotor core includes a substantially disk-shaped second core base and a plurality of secondary claw-shaped magnetic poles formed at equal intervals on an outer peripheral part of the second core base. The secondary claw-shaped magnetic poles protrude radially outward and extending in the axial direction. Each secondary claw-shaped magnetic pole is arranged between corresponding primary claw-shaped magnetic poles. The field member is arranged between the first core base and the second core base in the axial direction. When magnetized in the axial direction, the field member causes the primary claw-shaped magnetic poles to function as primary magnetic poles and the secondary claw-shaped magnetic poles to function as secondary magnetic poles. Each of the auxiliary magnets is arranged in one of a clearance formed by the back surface of one of the claw-shaped magnetic pole and a clearance between one of the primary claw-shaped magnetic poles and the corresponding one of the secondary claw-shaped magnetic poles in a circumferential direction. At least the auxiliary magnets or the field member is formed integrally with at least one of the first rotor core and the second rotor core.

According to this aspect, the auxiliary magnets arranged in at least either of the clearances formed by the back surfaces of the respective claw-shaped magnetic poles or the clearances between the respective claw-shaped magnetic poles in the circumferential direction are formed as an integral component with at least one of the first and second rotor cores. This can reduces the number of components as compared with a configuration as a comparative example in which the respective rotor cores, the field member and the auxiliary magnets are all separate bodies. This also leads to a smaller number of component assembling steps and, consequently, contributes to a reduction in component assembling cost. Further, magnetic fluxes can be made difficult to leak from clearances of the rotor by the auxiliary magnets. Furthermore, according to this aspect, since the field member is formed as an integral component with at least one of the first and second rotor cores, the number of components is reduced as compared with a configuration as a comparative example in which the respective rotor cores and the field member are all separate bodies. Further, the number of component assembling steps is reduced, and hence, component assembling cost is reduced.

In accordance with one form of the present disclosure, the auxiliary magnets include primary back magnets arranged in the clearances formed by the back surfaces of the primary claw-shaped magnetic poles and secondary back magnets arranged in the clearances formed by the back surfaces of the secondary claw-shaped magnetic poles. The primary back magnets are formed integrally with the first rotor core. The secondary back magnets are formed integrally with the second rotor core.

According to this aspect, leakage magnetic fluxes from the clearances formed by the back surfaces of the respective claw-shaped magnetic poles are suppressed by the respective back magnets and the number of components is reduced.

In accordance with one form of the present disclosure, the auxiliary magnets are formed integrally with each rotor core and the field member.

According to this aspect, the rotor is composed of a smaller number of components since the respective rotor cores, the field member and the auxiliary magnets are formed as an integral component.

In accordance with one form of the present disclosure, the rotor cores are formed by powder magnetic cores.

According to this aspect, the respective rotor cores can be compression molded together with the auxiliary magnets or the field member since the respective rotor cores are formed by powder magnetic cores. This contributes to simplification in manufacturing.

In accordance with one form of the present disclosure, a motor including the above described rotor is provided.

Another aspect of the present disclosure is directed to a rotor manufacturing method that includes: providing a first rotor core including a substantially disk-shaped first core base and a plurality of primary claw-shaped magnetic poles formed at equal intervals on an outer peripheral part of the first core base, the primary claw-shaped magnetic poles protrude radially outward and extend in an axial direction; providing a second rotor core including a substantially disk-shaped second core base and a plurality of secondary claw-shaped magnetic poles formed at equal intervals on an outer peripheral part of the second core base, the secondary claw-shaped magnetic poles protruding radially outward and extending in the axial direction and each secondary claw-shaped magnetic pole being arranged between corresponding primary claw-shaped magnetic poles; providing a field member arranged between the first core base and the second core base in the axial direction and causing the primary claw-shaped magnetic poles to function as primary magnetic poles and the secondary claw-shaped magnetic poles to function as secondary magnetic poles by being magnetized in the axial direction; providing auxiliary magnets arranged in either one of clearances formed by the back surfaces of the respective claw-shaped magnetic poles and clearances between the primary claw-shaped magnetic poles and the secondary claw-shaped magnetic poles in a circumferential direction; and forming at least either the auxiliary magnets or the field member integrally with at least either one of the first rotor core and the second rotor core.

According to this aspect, the auxiliary magnets arranged in at least either of the clearances formed by the back surfaces of the respective claw-shaped magnetic poles and the clearances between the respective claw-shaped magnetic poles in the circumferential direction are formed as an integral component with at least one of the first and second rotor cores. This reduces the number of components as compared with a configuration as a comparative example in which the respective rotor cores, the field member and the auxiliary magnets are all separate bodies. This can also lead to a smaller number of component assembling steps and, consequently, can contribute to a reduction in component assembling cost. Further, magnetic fluxes can be made difficult to leak from clearances of the rotor by the auxiliary magnets. Furthermore, according to this aspect, since the field member is formed as an integral component with at least one of the first and second rotor cores, the number of components is reduced as compared with a configuration as a comparative example in which the respective rotor cores and the field member are all separate bodies. This can also lead to a smaller number of component assembling steps and, consequently, can contribute to a reduction in component assembling cost.

Other aspects and advantages of the discloser will become apparent from the following description, taken in conjunction with the accompanying drawings, illustrating by way of example the principles of the disclosure.

BRIEF DESCRIPTION OF THE DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings in which:

DESCRIPTION OF THE PREFERRED EMBODIMENTS

First Embodiment

A first embodiment of the present disclosure will now be described with reference to the drawings.

Figure 1:
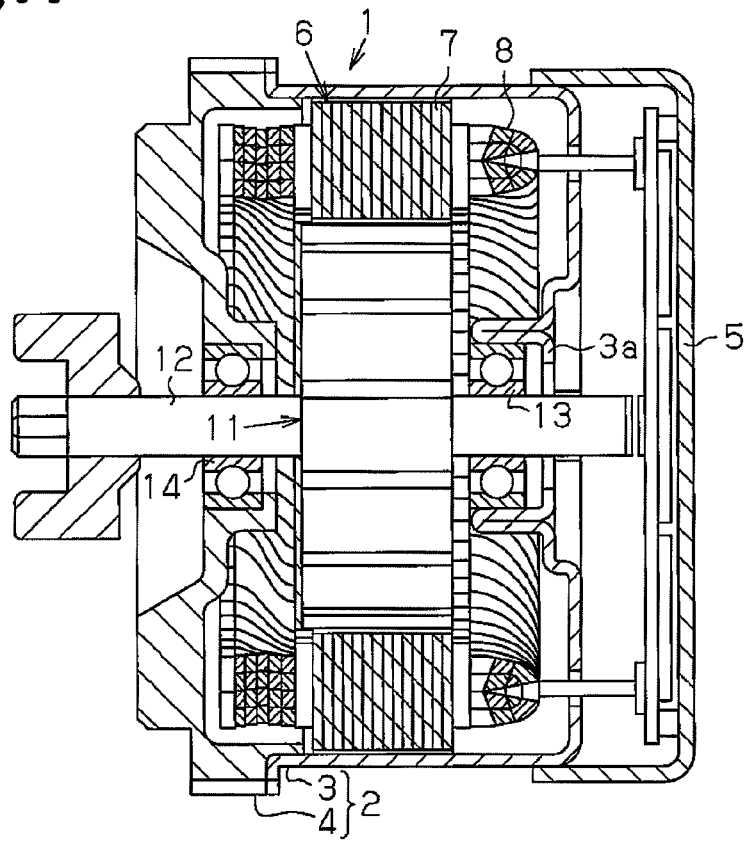
FIG. 1 is a cross-sectional view of a motor of a first embodiment.

As shown in FIG. 1, a motor case 2 of a motor 1 includes a cylindrical, housing 3 in the form of a tube with a closed end and a front end plate 4 for closing an opening at a front side of the cylindrical housing 3, i.e. located on a left side in FIG. 1. A circuit storage box 5 storing a power supply circuit such as a circuit board is mounted on a rear side of the cylindrical housing 3, i.e. on an end part located on a right side in FIG. 1. A stator 6 is fixed to the inner peripheral surface of the cylindrical housing 3.

Figure 2:
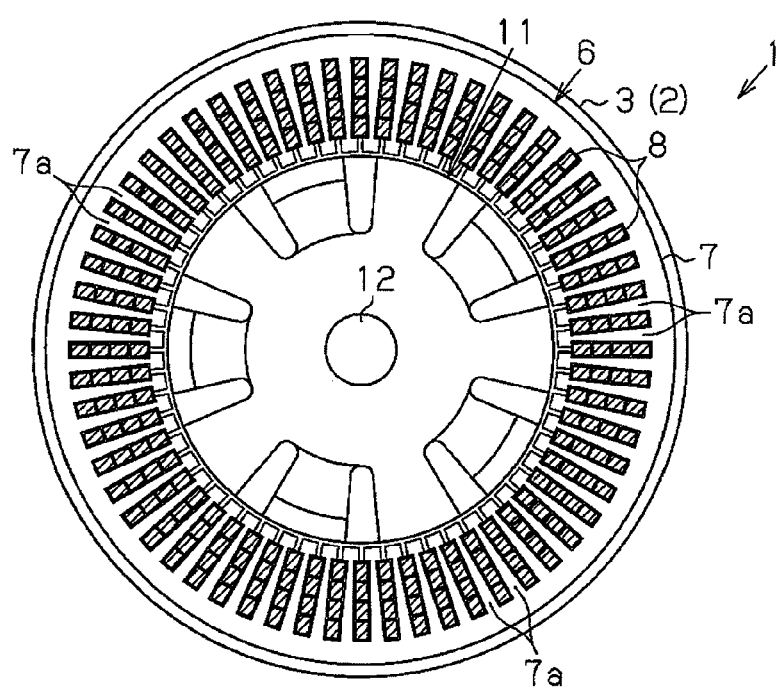
FIG. 2 is a cross-sectional view in a direction perpendicular to an axis of the motor in FIG. 1.

As shown in FIG. 2, the stator 6 includes an armature core 7 with a plurality of teeth 7a extending radially inward and a segment conductor (SC) coil 8 wound on the teeth 7a of the armature core 7. A rotor 11 of the motor 1 includes a rotary shaft 12 and is arranged inside the stator 6. The rotary shaft 12 is a metal shaft made of nonmagnetic material and rotationally supported by a bearing 13 supported on a bottom part 3a of the cylindrical housing 3 and a bearing 14 supported on the front end plate 4.

(Rotor 11)

Figure 3:
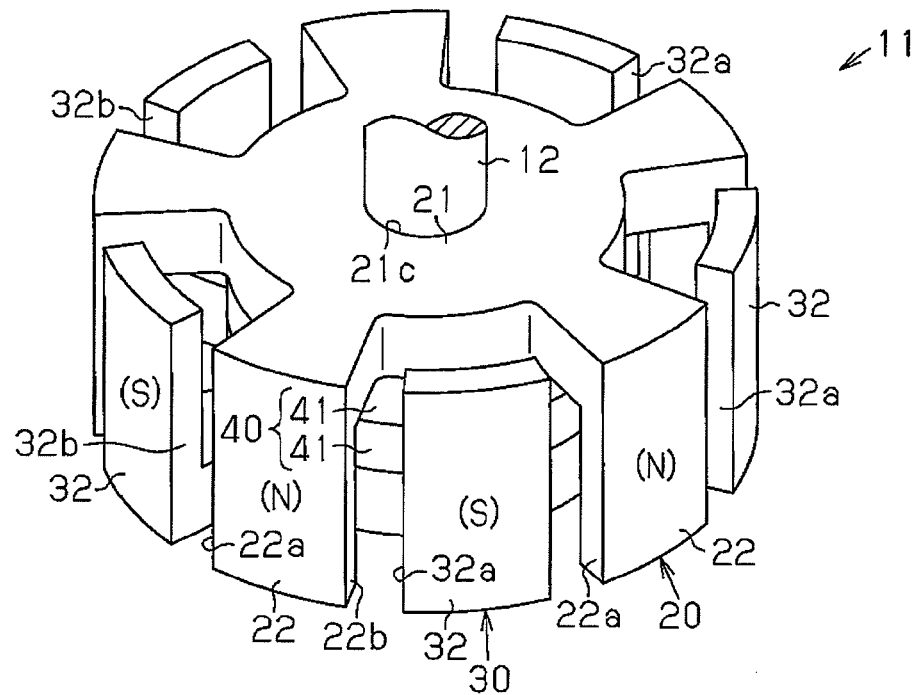
FIG. 3 is a perspective view of the rotor in FIG. 1.
Figure 4:
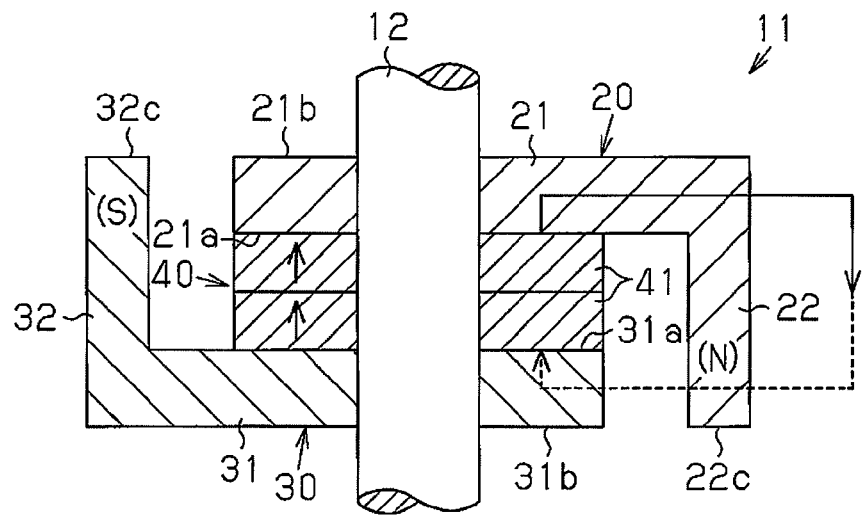
FIG. 4 is a cross-sectional view of the rotor in FIG. 3.
Figure 5:
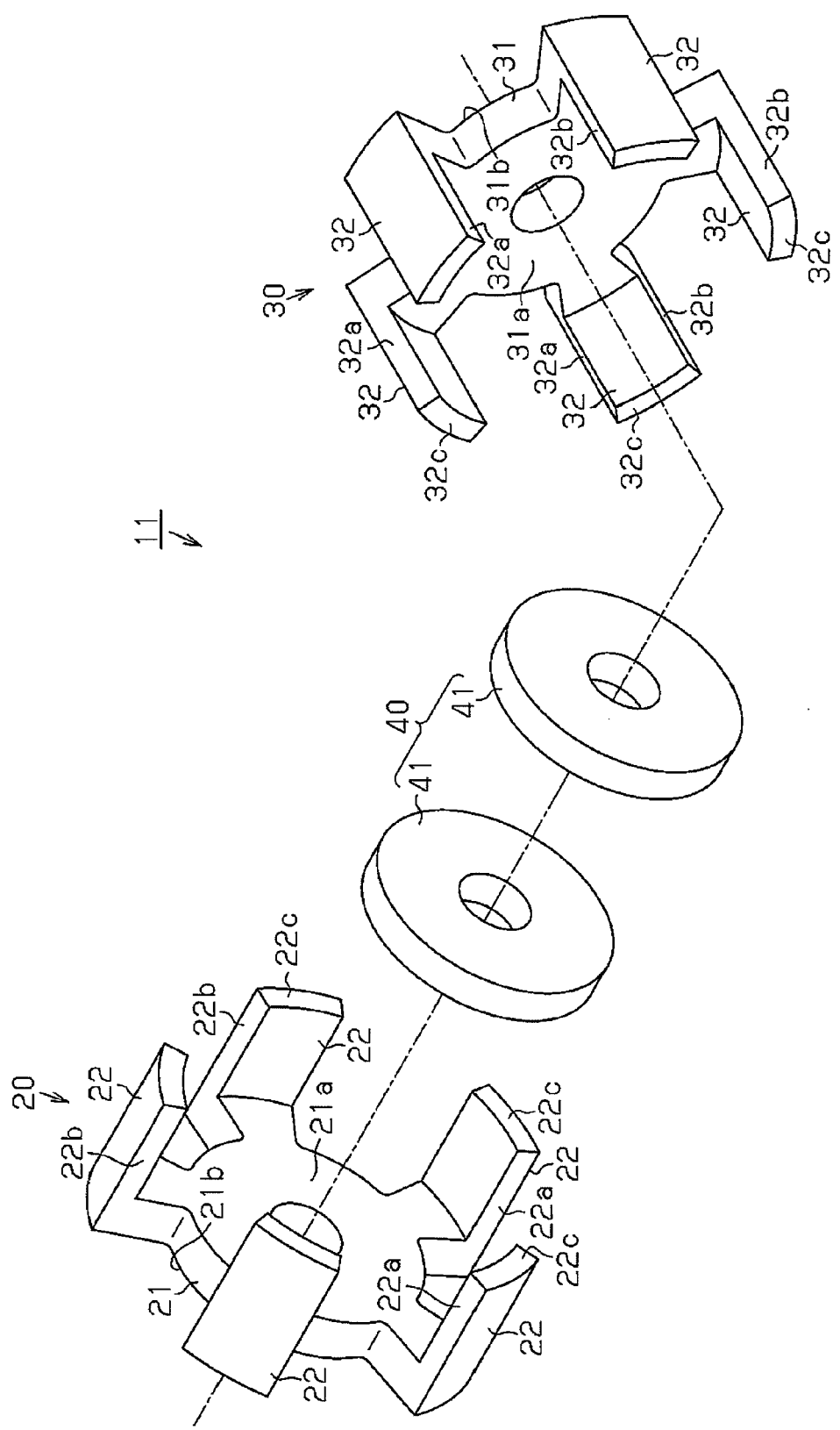
FIG. 5 is an exploded perspective view of the rotor in FIG. 3.

As shown in FIGS. 3, 4 and 5, the rotor 11 includes a first rotor core 20, a second rotor core 30 and an annular field member 40 as a field member and a field magnet. The annular field member 40 will be described with reference to FIGS. 4 and 5.

(First Rotor Core 20)

As shown in FIGS. 3, 4 and 5, the first rotor core 20 includes a substantially disk-shaped first core base 21 and a plurality of primary claw-shaped magnetic poles 22 formed at equal intervals on an outer peripheral part of the first core base 21. The primary claw-shaped magnetic poles 22 protrude radially outward and are bent to extend in the axial direction. In the first embodiment, there are five primary claw-shaped magnetic poles 22. Circumferential end surfaces 22a, 22b of the primary claw-shaped magnetic pole 22 are flat surfaces extending in a radial direction and not inclined with respect to the radial direction when viewed in the axial direction. The primary claw-shaped magnetic pole 22 has a sectoral cross-section in a direction perpendicular to the axis. The angle of each primary claw-shaped magnetic pole 22 in the circumferential direction, i.e. the angle between the circumferential end surfaces 22a and 22b is set to be smaller than the angle of the clearance between the primary claw-shaped magnetic poles 22 adjacent in the circumferential direction.

(Second Rotor Core 30)

As shown in FIGS. 3, 4 and 5, the second rotor core 30 has the same shape as the first rotor core 20. The second rotor core 30 includes a substantially disk-shaped second core base 31 and a plurality of secondary claw-shaped magnetic poles 32 formed at equal intervals on an outer peripheral part of the second core base 31. The secondary claw-shaped magnetic poles 32 protrude radially outward and are bent to extend in the axial direction. Circumferential end surfaces 32a, 32b of the secondary claw-shaped magnetic pole 32 are flat surfaces extending in the radial direction and not inclined with respect to the radial direction when viewed in the axial direction. The secondary claw-shaped magnetic pole 32 has a sectoral cross-section in a direction perpendicular to the axis. The angle of each secondary claw-shaped magnetic pole 32 in the circumferential direction, i.e. the angle between the circumferential end surfaces 32a and 32b is set to be smaller than the angle of the clearance between the secondary claw-shaped magnetic poles 32 adjacent in the circumferential direction.

Each secondary claw-shaped magnetic pole 32 of the second rotor core 30 is arranged between corresponding primary claw-shaped magnetic poles 22. At this time, the second rotor core 30 is assembled with the first rotor core 20 such that the annular field member 40 shown in FIG. 4 is arranged and sandwiched between the first core base 21 and the second core base 31 in the axial direction.

Specifically, the first core base 21 includes an inward facing surface 21a facing the second core base 31, the second core base 31 includes an inward facing surface 31a facing the first core base 21, and the annular field member 40 is sandwiched between the inward facing surface 21a of the first core base 21 and the inward facing surface 31a of the second core base 31.

At this time, one circumferential end surface 22a of the primary claw-shaped magnetic pole 22 and the other circumferential end surface 32b of the secondary claw-shaped magnetic pole 32 are formed to be parallel to each other in the axial direction. Thus, the clearance between one circumferential end surface 22a of the primary claw-shaped magnetic pole 22 and the other circumferential end surface 32b of the secondary claw-shaped magnetic pole 32 is substantially straight in the axial direction. Similarly, the other circumferential end surface 22b of the primary claw-shaped magnetic pole 22 and one circumferential end surface 32a of the secondary claw-shaped magnetic pole 32 are formed to be parallel to each other in the axial direction. Thus, the clearance between the other circumferential end surface 22b of the primary claw-shaped magnetic pole 22 and one circumferential end surface 32a of the secondary claw-shaped magnetic pole 32 is substantially straight in the axial direction.

(Annular Field Member 40)

As shown in FIGS. 4 and 5, the annular field member 40 is sandwiched between the first rotor core 20 and the second rotor core 30 and formed by placing a plurality of unit permanent magnets 41 one over another. In this embodiment, there are two unit permanent magnets 41. The outer diameter of the unit permanent magnets 41 is set to be equal to that of the first core base 21 and that of the second core base 31. The thickness of the unit permanent magnets 41 is set at a predetermined thickness.

In the first embodiment, the number of the unit permanent magnets 41 used in the annular field member 40 and placed one over the other is determined by the axial length of the primary claw-shaped magnetic poles 22 and that of the secondary claw-shaped magnetic poles 32.

That is, when the annular field member 40 is sandwiched between the first rotor core 20 and the second rotor core 30, the number of the unit permanent magnets 41 is selected such that tip end surfaces 22c of the primary claw-shaped magnetic poles 22 and an outward facing surface 31b of the second core base 31 are flush with each other and tip end surfaces 32c of the secondary claw-shaped magnetic poles 32 and an outward facing surface 21b of the first core base 21 are flush with each other.

In the first embodiment, the annular field member 40 is formed by placing the two unit permanent magnets 41 one over the other and the tip end surfaces 22c of the primary claw-shaped magnetic poles 22 and the outward facing surface 31b of the second core base 31 are flush with each other and the tip end surfaces 32c of the secondary claw-shaped magnetic poles 32 and the outward facing surface 21b of the first core base 21 are flush with each other.

That is, the annular field member 40 is formed by placing the two unit permanent magnets 41 one over the other and the axial length of the rotor 11 is set to be substantially equal to that of the armature core 7.

In other words, the axial length of the rotor 11 can be adjusted by changing the number of the unit permanent magnets 41 to adjust the thickness of the annular field member 40.

The two unit permanent magnets 41 constituting the annular field member 40 are placed one over the other so as to have the same direction of magnetization. In FIG. 4, arrows shown by solid line in the unit permanent magnets 41 indicate the direction of magnetization, i.e. a direction from a south pole to a north pole of the field member 40.

The annular field member 40 is magnetized in the axial direction to cause the primary claw-shaped magnetic poles 22 to function as primary magnetic poles and the secondary claw-shaped magnetic poles 32 to function as secondary magnetic poles. In the first embodiment, the primary magnetic poles are north poles and the secondary magnetic poles are south poles.

Accordingly, the rotor 11 of the first embodiment is a rotor having a Lundell-type structure using the annular field member 40. In the rotor 11, the primary claw-shaped magnetic poles 22 serving as north poles and the secondary claw-shaped magnetic poles 32 serving as south poles are alternately arranged in the circumferential direction and there are ten magnetic poles, i.e. there are five pole pairs. Since the number of the pole pairs is an odd number greater than or equal to three, the claw-shaped magnetic poles having the same polarity are not at opposite positions spaced apart by 180° in the circumferential direction in each rotor core. Thus, such an arrangement of the claw-shaped magnetic poles is stable against magnetic vibration.

In the motor 1 configured as described above, a magnetic field for rotating the rotor 11 is generated in the stator 6, and the rotor 11 is rotated when a three-phase drive current is supplied to the segment conductor (SC) coil 8 via the power supply circuit in the circuit storage box 5.

Operation of the first embodiment configured as described above will now be described.

The thickness of the annular field member 40 is adjusted only by providing the unit permanent magnets 41 and changing the number of the unit permanent magnets 41 placed one over the other. Even if the axial length of the rotor 11 differs, the first embodiment can be applied to various rotors having different axial lengths by changing the number of the unit permanent magnets 41.

Further, an output characteristic of the motor 1 can be appropriately changed and adjusted without changing the size of the motor 1, for example, by changing the two unit permanent magnets 41 to unit permanent magnets having mutually different magnetic flux densities.

The first embodiment has the following advantages.

(1) According to the first embodiment, the annular field member 40 sandwiched between the first rotor core 20 and the second rotor core 30 is formed by placing a plurality of, e.g.

two unit permanent magnets 41 one over another. The axial length of the rotor 11 is adjusted and made suitable by changing the number of the unit permanent magnets 41 to adjust the thickness of the annular field member 40.

Thus, the first embodiment can be applied to rotors 11 of various different sizes only by providing one type of permanent magnet components called unit permanent magnets 41. As a result, only one type of permanent magnet components is necessary, wherefore components can be easily managed and made uniform and suitable.

(2) According to the first embodiment, the annular field member 40 is formed by placing a plurality of unit permanent magnets 41 one over another. Specifically, the thickness, i.e. axial length of the annular field member 40, which is a permanent magnet, can be increased by a plurality of unit permanent magnets 41.

Thus, in the first embodiment, it is not necessary to use one thick permanent magnet, which is difficult to produce and costly, as the annular field member. Therefore, a cost reduction can be realized without reducing the output of the motor 1.

(3) Further, according to the first embodiment, the output characteristic of the motor 1 can be appropriately changed and adjusted without changing the size of the motor 1 by forming the annular field member 40 by two unit permanent magnets 41 having mutually different magnetic flux densities.

The first embodiment may be modified as follows.

In the first embodiment, the annular field member 40 is formed by two unit permanent magnets 41. However, the embodiment is not limited to two unit permanent magnets 41, but three or more unit permanent magnets may be placed one over another in conformity with the size of a rotor.

In the first embodiment, the respective unit permanent magnets 41 have the same thickness, i.e., have one thickness. However, the axial length of the rotor can be accurately and finely, adjusted by providing a plurality of types of unit permanent magnets having mutually different thicknesses and appropriately combining and placing these types of unit permanent magnets one over another.

Figure 6:
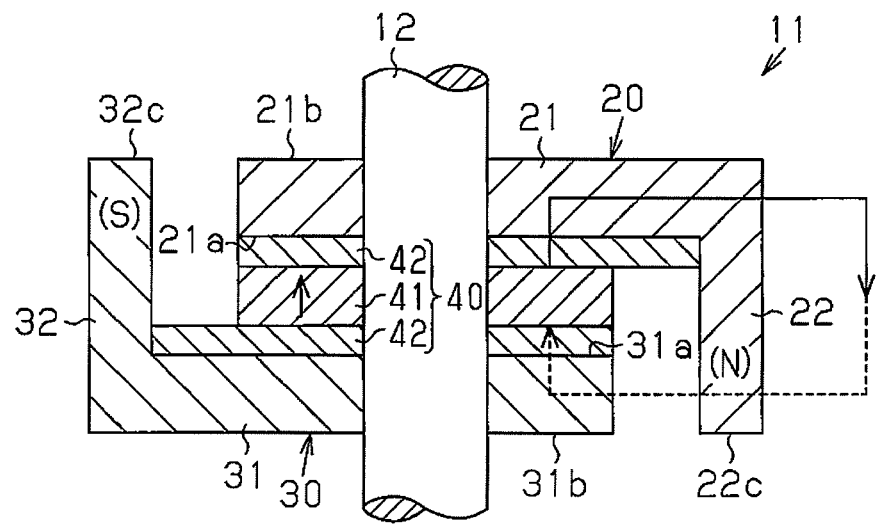
FIG. 6 is a cross-sectional view showing a rotor of a modification.

In the first embodiment, the annular field member 40 is formed by two unit permanent magnets 41. Without being limited to this, the annular field member 40 may be formed by arranging one magnetic member 42 made of the same magnetic material as the first rotor core 20 and the second rotor core 30 on each of opposite sides of one unit permanent magnet 41 as shown in FIG. 6. In this case, the annular field member 40 may be formed by making the magnetic members 42 of a magnetic material different from the magnetic material of the first rotor core 20 and the second rotor core 30, e.g. a magnetic material having a high magnetic permeability. The rotor 11 may be embodied by improving the output of the motor 1 in this way.

Figure 7:
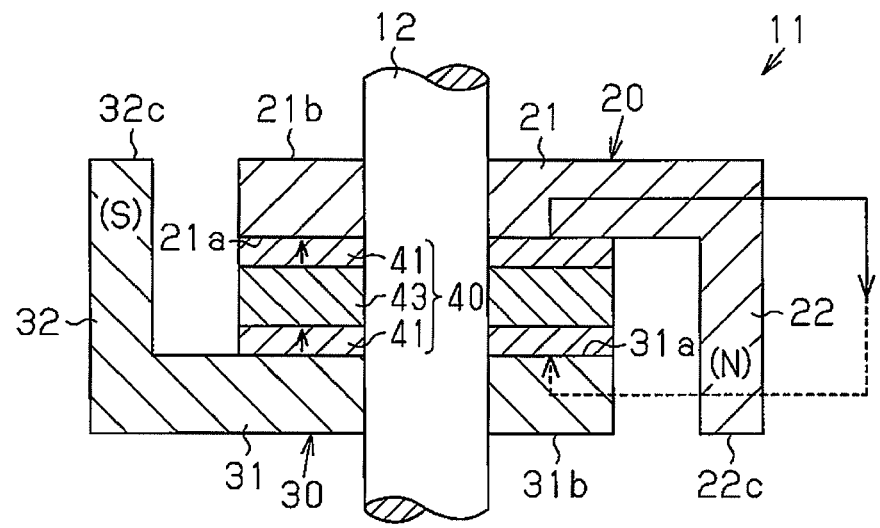
FIG. 7 is a cross-sectional view showing a rotor of another modification.

In the first embodiment, the annular field member 40 is formed by two unit permanent magnets 41. Without being limited to this, the annular field member 40 may be formed by providing two unit permanent magnets 41 and arranging a magnetic member 43 made of the same magnetic material as the first rotor core 20 and the second rotor core 30 between the two unit permanent magnets 41 as shown in FIG. 7. Also in this case, the annular field member 40 may be similarly formed by making the magnetic member 43 of a magnetic material different from the magnetic material of the first rotor core 20 and the second rotor core 30, e.g. a magnetic material having a high magnetic permeability. The rotor 11 may be embodied by improving the output of the motor 1 in this way.

Second Embodiment

A second embodiment of the present disclosure will now described with reference to the drawings.

Figure 8:
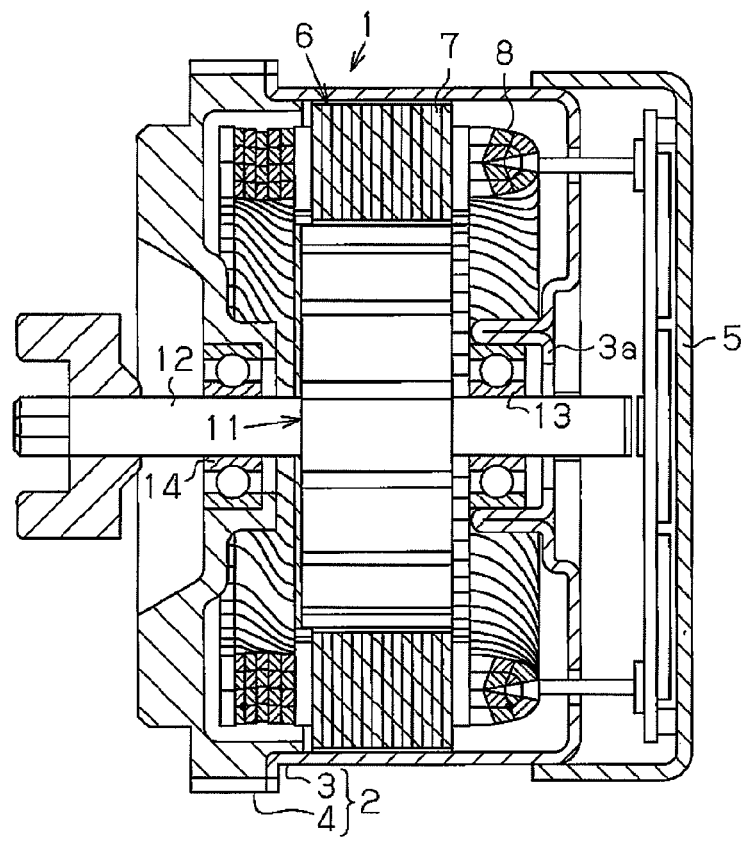
FIG. 8 is a cross-sectional view of a motor of a second embodiment.

As shown in FIG. 8, a motor case 2 of a motor 1 includes a cylindrical housing 3 in the form of a tube with a closed end and a front end plate 4 for closing an opening at a front side of the cylindrical housing 3, i.e. located on a left side in FIG. 8. A circuit storage box 5 storing a power supply circuit such as a circuit board is mounted on a rear side of the cylindrical housing 3, i.e. on an end part located on a right side in FIG. 8. A stator 6 is fixed to the inner peripheral surface of the cylindrical housing 3.

Figure 9:
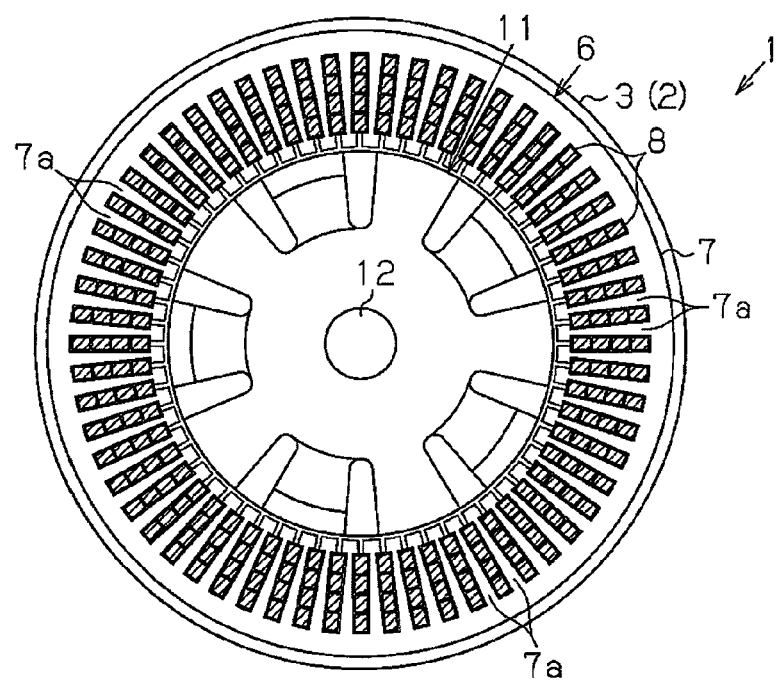
FIG. 9 is a cross-sectional view in a direction perpendicular to an axis of the motor in FIG. 8.

As shown in FIG. 9, the stator 6 includes an armature core 7 with a plurality of teeth 7a extending radially inward and a segment conductor (SC) coil 8 wound on the teeth 7a of the armature core 7. A rotor 11 of the motor 1 includes a rotary shaft 12 and is arranged inside the stator 5. The rotary shaft 12 is a metal shaft made of nonmagnetic material and rotationally supported by a bearing 13 supported on a bottom part 3a of the cylindrical housing 3 and a bearing 14 supported on the front end plate 4.

(Rotor 11)

Figure 10:
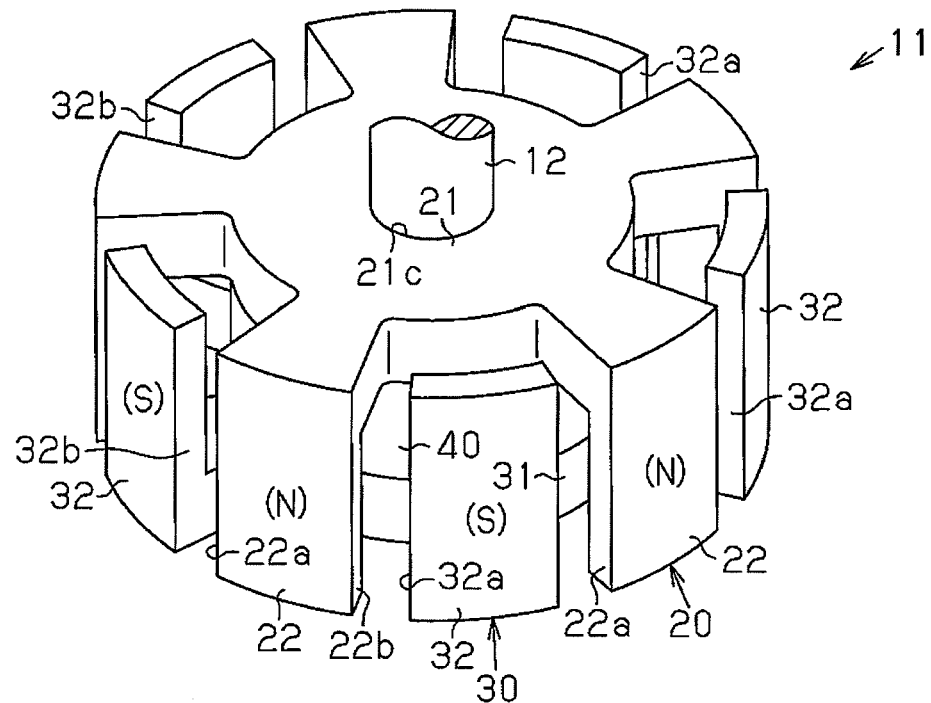
FIG. 10 is a perspective view of the rotor in FIG. 8.
Figure 11:
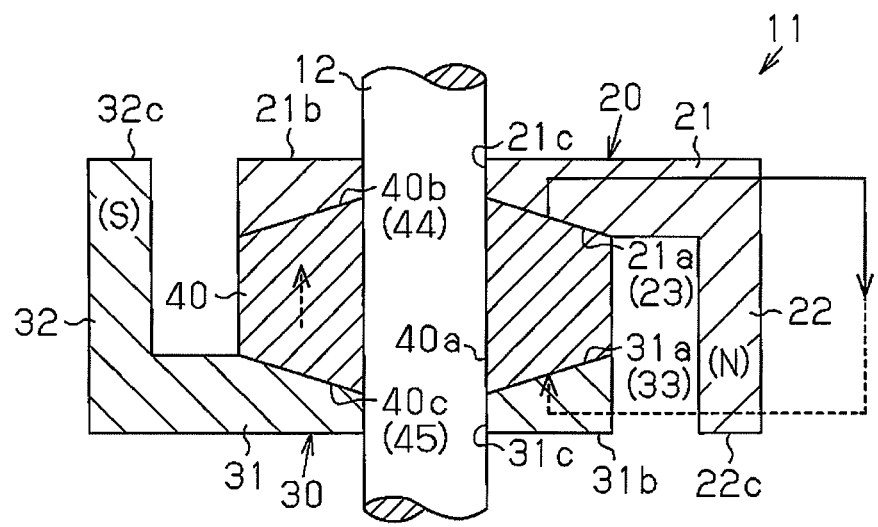
FIG. 11 is a cross-sectional view of the rotor in FIG. 10.
Figure 12:
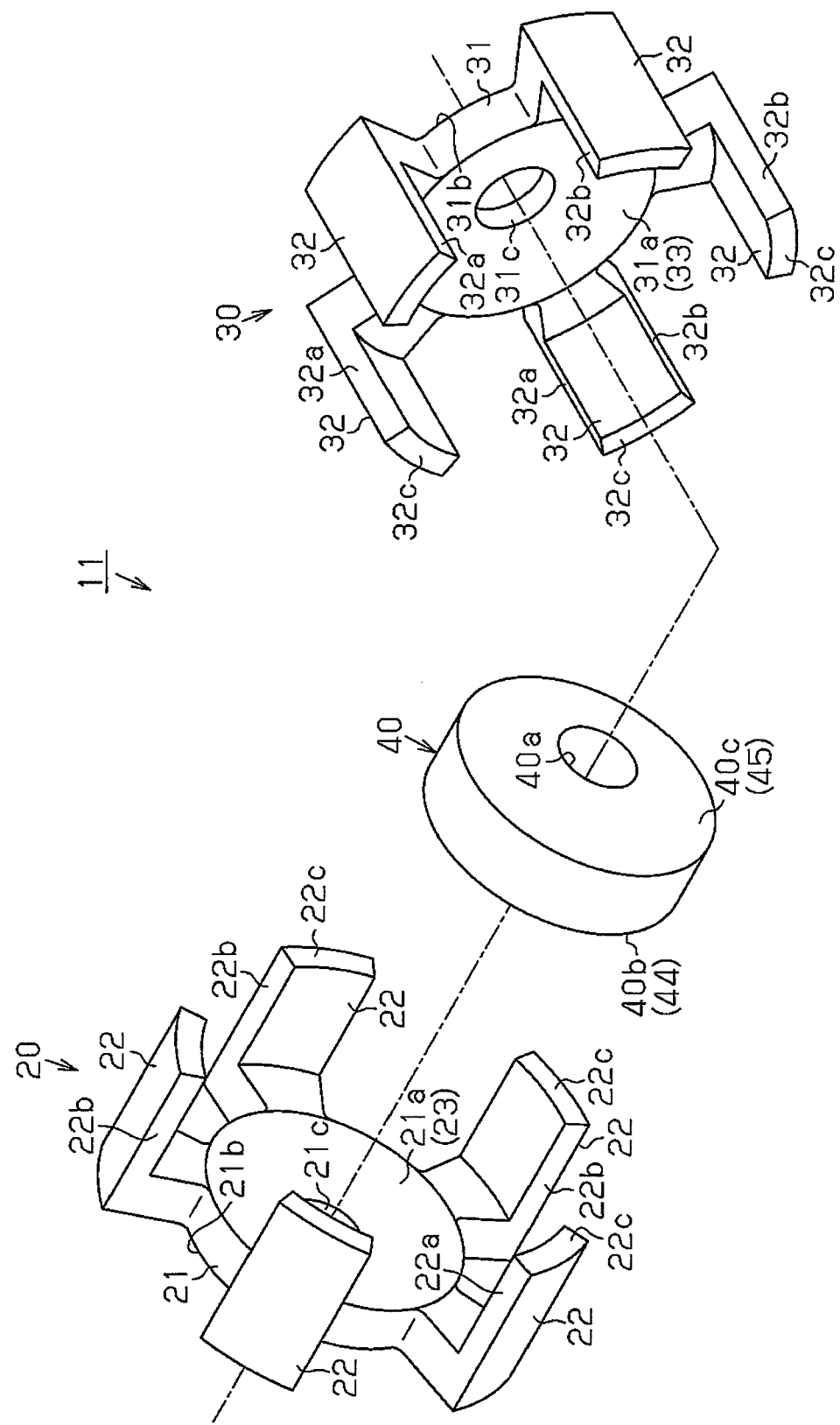
FIG. 12 is an exploded perspective view of the rotor in FIG. 10.

As shown in FIGS. 10, 11 and 12, the rotor 11 includes a first rotor core 20, a second rotor core 30 and a field member 40, which is a field magnet. The field member 40 is illustrated in FIGS. 11 and 12.

(First Rotor Core 20)

As shown in FIGS. 10, 11 and 12, the first rotor core 20 includes a substantially disk-shaped first core base 21 and a plurality of primary claw-shaped magnetic poles 22 formed at equal intervals on an outer peripheral part of the first core base 21. The primary claw-shaped magnetic poles 22 protrude radially outward and are bent to extend in the axial direction. In the second embodiment, there are five primary claw-shaped magnetic poles 22. Circumferential end surfaces 22a, 22b of the primary claw-shaped magnetic pole 22 are flat surfaces extending in a radial direction and not inclined with respect to the radial direction when viewed in the axial direction. The primary claw-shaped magnetic pole 22 has a sectoral cross-section in a direction perpendicular to the axis. The angle of each primary claw-shaped magnetic pole 22 in the circumferential direction, i.e. the angle between the circumferential end surfaces 22a and 22b is set to be smaller than the angle of the clearance between the primary claw-shaped magnetic poles 22 adjacent in the circumferential direction.

A shaft hole 21c through which the rotary shaft 12 is inserted and fixed is formed at a center position of the substantially disk-shaped first core base 21. The first core base 21 includes an inward facing surface 21a facing the second rotor core 30 and the inward facing surface 21a is recessed. Specifically, the inward facing surface 21a is recessed as a truncated conical surface, of which the diameter decreases toward the shaft hole 21c. In the second embodiment, the inward facing surface 21a recessed as the truncated conical surface defines a first fitting recess 23.

(Second Rotor Core 30)

As shown in FIGS. 10, 11 and 12, the second rotor core 30 has the same shape as the first rotor core 20 and includes a substantially disk-shaped second core base 31 and a plurality of secondary claw-shaped magnetic poles 32 formed at equal intervals on an outer peripheral part of the second core base 31. The secondary claw-shaped magnetic poles 32 protrude radially outward and are bent to extend in the axial direction. In the second embodiment, there are five secondary claw-shaped magnetic poles 32. Circumferential end surfaces 32a, 32b of the secondary claw-shaped magnetic pole 32 are flat surfaces extending in the radial direction and not inclined with respect to the radial direction when viewed in the axial direction. The secondary claw-shaped magnetic pole 32 has a sectoral cross-section in a direction perpendicular to the axis. The angle of each secondary claw-shaped magnetic pole 32 in the circumferential direction, i.e. the angle between the circumferential end surfaces 32a and 32b is set to be smaller than the angle of the clearance between the secondary claw-shaped magnetic poles 32 adjacent in the circumferential direction.

A shaft hole 31c through which the rotary shaft 12 is inserted and fixed is formed at a center position of the substantially disk-shaped second core base 31. The second core base 31 facing the first rotor core 20 includes an inward facing surface 31a facing the first rotor core 20 and the inward facing surface 31a is recessed. Specifically, the inward facing surface 31a is recessed as a truncated conical surface, of which the diameter decreases toward the shaft hole 31c. In the second embodiment, the inward facing surface 31a recessed as the truncated conical surface defines a second fitting recess 33.

Each secondary claw-shaped magnetic pole 32 of the second rotor core 30 is arranged between corresponding primary claw-shaped magnetic poles 22. The second rotor core 30 is assembled with the first rotor core 20 such that the field member 40 shown in FIG. 11 is arranged and sandwiched between the first core base 21 and the second core base 31 in the axial direction.

Specifically, the field member 40 is sandwiched between the first fitting recess 23 of the first core base 21 and the second fitting recess 33 of the second core base 31.

One circumferential end surface 22a of the primary claw-shaped magnetic pole 22 and the other circumferential end surface 32b of the secondary claw-shaped magnetic pole 32 are arranged to face each other and extend in parallel in the axial direction. Thus, the clearance between one circumferential end surface 22a of the primary claw-shaped magnetic pole 22 and the other circumferential end surface 32b of the secondary claw-shaped magnetic pole 32 is formed to be substantially straight in the axial direction. Similarly, the other circumferential end surface 22b of the primary claw-shaped magnetic pole 22 and one circumferential end surface 32a of the secondary claw-shaped magnetic pole 32 are arranged to face each other and extend in parallel in the axial direction. Thus, the clearance between the other circumferential end surface 22b of the primary claw-shaped magnetic pole 22 and one circumferential end surface 32a of the secondary claw-shaped magnetic pole 32 is formed to be substantially straight in the axial direction.

(Field Member 40)

As shown in FIGS. 11 and 12, the field member 40 sandwiched between the first rotor core 20 and the second rotor core 30 is a permanent magnet that is cylindrically formed. The outer diameter of the field member 40 is set to be equal to that of the first core base 21 and that of the second core base 31, A shaft hole 40a through which the rotary shaft 12 is inserted and fixed is formed at a center position of the cylindrical field member 40.

A first end surface 40b of the field member 40 facing the first rotor core 20 protrudes. Specifically, the first end surface 40b protrudes as a truncated conical tapered surface, of which the diameter decreases toward the shaft hole 40a. In the second embodiment, the first end surface 40b protruding as the truncated conical shape defines a first fitting protrusion 44. Thus, the first end surface 40b of the field member 40 facing the first rotor core 20 is formed not to be perpendicular to the axial direction, thereby increasing the surface area of the first end surface 40b.

A second end surface 40c of the field member 40 facing the second rotor core 30 protrudes. Specifically, the second end surface 40c protrudes as a truncated conical tapered surface, of which the diameter decreases toward the shaft hole 40a. In the second embodiment, the second end surface 40c protruding as the truncated conical shape defines a second fitting protrusion 45. Thus, the second end surface 40c of the field member 40 facing the second rotor core 30 is formed not to be perpendicular to the axial direction, thereby increasing the surface area of the second end surface 40c.

When the field member 40 is sandwiched between the first rotor core 20 and the second rotor core 30, the first fitting recess 23 is held in close contact with the first fitting protrusion 44 and the second fitting recess 33 is held in close contact with the second fitting protrusion 45. Further, the field member 40 is formed such that tip end surfaces 22c of the primary claw-shaped magnetic poles 22 and an outward facing surface 31b of the second core base 31 are flush with each other, and tip end surfaces 32c of the secondary claw-shaped magnetic poles 32 and an outward facing surface 21b of the first core base 21 are flush with each other.

The field member 40 is magnetized in a direction of magnetization shown by a broken-line arrow in the field member 40 in FIG. 11, i.e. in a direction from a south pole to a north pole. The field member 40 is magnetized in the axial direction to cause the primary claw-shaped magnetic poles 22 to function as primary magnetic poles and the secondary claw-shaped magnetic poles 32 to function as secondary magnetic poles. In the second embodiment, the primary magnetic poles are north poles and the secondary magnetic poles are south poles.

Accordingly, the rotor 11 of the second embodiment is a rotor having a Lundell-type structure using the field member 40. In the rotor 11, the primary claw-shaped magnetic poles 22 serving as north poles and the secondary claw-shaped magnetic poles 32 serving as south poles are alternately arranged in the circumferential direction and there are ten magnetic poles, i.e., there are five pole pairs. Since the number of the pole pairs is an odd number greater than or equal to three, the claw-shaped magnetic poles having the same polarity are not at opposite positions spaced apart by 180° in the circumferential direction in each rotor core. Thus, such an arrangement of the claw-shaped magnetic poles is stable against magnetic vibration.

When the field member 40 is sandwiched between the first rotor core 20 and the second rotor core 30, the surface area of the first end surface 40b of the field member 40 facing the first rotor core 20 and that of the second end surface 40c facing the second rotor core 30 are increased by forming the first end surface 40b and the second end surface 40c into the tapered surfaces. Thus, magnetic flux densities for the first core base 21 and the second core base 31 can be increased.

In the motor 1 configured as described above, a magnetic field for rotating the rotor 11 is generated in the stator 6 and the rotor 11 is rotated when a three-phase drive current is supplied to the segment conductor (SC) coil 8 via the power supply circuit in the circuit storage box 5.

Operation of the second embodiment configured as described above will now be described.

In the rotor 11 having a Lundell-type structure, the first fitting protrusion 44 having a truncated conical shape is formed to protrude on the first end surface 40b of the field member 40 sandwiched between the first rotor core 20 and the second rotor core 30, and the second fitting protrusion 45 having a truncated conical shape is formed to protrude on the second end surface 40c of the field member 40. The first fitting recess 23 having a truncated conical shape is provided by recessing the inward facing surface 21a of the first rotor core 20 and the second fitting recess 33 having a truncated conical shape is provided by recessing the inward facing surface 31a of the second rotor core 30.

When the field member 40 is sandwiched between the first rotor core 20 and the second rotor core 30, the first fitting recess 23 of the first rotor core 20 is fitted to the first fitting protrusion 44 of the field member 40 and the second fitting recess 33 of the second rotor core 30 is fitted to the second fitting protrusion 45 of the field member 40.

At this time, a part of the inward facing surface 21a of the first rotor core 20 held in contact with the first end surface 40b of the field member 40 is not a surface perpendicular to the axial direction, but a surface inclined with respect to the axial direction since the first fitting protrusion 44 and the first fitting recess 23 have the truncated conical shapes.

Accordingly, the surface area of the contact surface of the first fitting protrusion 44 of the first end surface 40b with the first fitting recess 23 of the inward facing surface 21a increases, magnetic resistance is reduced, and a magnetic flux density from the field member 40 to the first core base 21 can be increased.

Similarly, a part of the inward facing surface 31a of the second rotor core 30 held in contact with the second end surface 40c of the field member 40 is not a surface perpendicular to the axial direction, but a surface inclined with respect to the axial direction since the second fitting protrusion 45 and the second fitting recess 33 have the truncated conical shapes.

Accordingly, the surface area of the contact surface of the second fitting protrusion 45 of the second end surface 40c with the second fitting recess 33 of the inward facing surface 31a increases, magnetic resistance is reduced, and a magnetic flux density from the second core base 31 to the field member 40 can be increased.

The second embodiment has the following advantages.

(4) According to the second embodiment, the first fitting recess 23 is formed as a truncated conical recess on the first core base 21 of the first rotor core 20 and the first fitting protrusion 44 is formed as a truncated conical protrusion on the first end surface 40b of the field member 40.

Further, the second fitting recess 33 is formed as a truncated conical recess on the second core base 31 of the second rotor core 30 and the second fitting protrusion 45 is formed as a truncated conical protrusion on the second end surface 40c of the field member 40.

Magnetic resistance is reduced by increasing the surface area of the contact surface of the field member 40 with the first core base 21 and that of the contact surface of the field member 40 with the second core base 31.

Thus, magnetic flux densities for the first core base 21 and the second core base 31 can be increased, and the output of the motor 1 can be increased.

(5) Further, according to the second embodiment, the output of the motor 1 can be easily adjusted without changing the overall shape of the rotor 11 by changing the depth (axial dimension) of the first fitting recess 23 and that of the second fitting recess 33 and changing the axial length of the first fitting protrusion 44 and that of the second fitting protrusion 45 in accordance with the former changes.

Third Embodiment

Next, a third embodiment of the present disclosure will be described. The third embodiment is characterized by the shape of a field member 40 and, in conformity with this shape, characterized by inward facing surfaces 21a, 31a of a first core base 21 and a second core base 31. In the following description, characteristic parts different from the second embodiment are described in detail and other common parts are omitted for the illustrative purposes.

Figure 13:
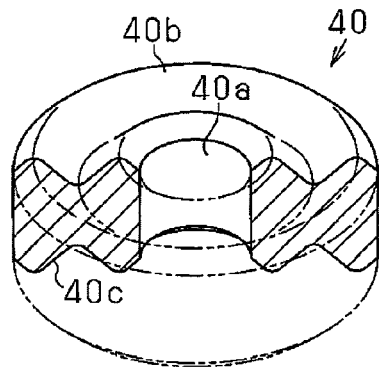
FIG. 13 is a perspective view, partly cut away, showing a field member of a third embodiment.

As shown in FIG. 13, the field member 40 sandwiched between the first core base 21 and the second core base 31 is formed such that a first end surface 40b facing the first core base 21 is a bellows-like corrugated surface extending radially outward, i.e. a cross-section of the first end surface 40b in a direction perpendicular to an axis has a sinusoidal shape. Thus, the first end surface 40b of the field member 40 facing the first core base 21 is a surface not perpendicular to the axial direction and the surface area of the first end surface 40b increases.

Similarly, the field member 40 is formed such that a second end surface 40c is a bellows-like corrugated surface extending radially outward, i.e. a cross-section of the second end surface 40c in a direction perpendicular to the axis has a sinusoidal shape. Thus, the second end surface 40c of the field member 40 facing the second core base 31 is a surface not perpendicular to the axial direction and the surface area of the second end surface 40c increases.

Figure 14:
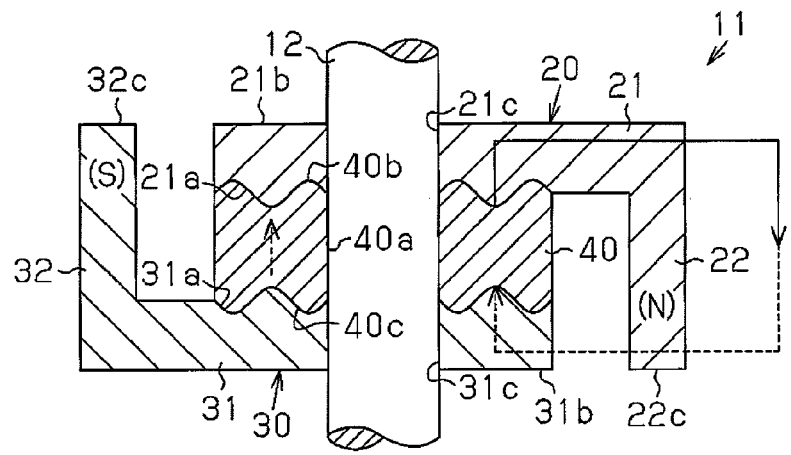
FIG. 14 is a cross-sectional view showing a rotor including the field member of FIG. 13.

On the other hand, as shown in FIG. 14, the first core base 21 includes the inward facing surface 21a and is formed such that the inward facing surface 21a is a bellows-like corrugated surface extending radially outward, i.e. an axial cross-section of the inward facing surface 21a has a sinusoidal shape. Further, the field member 40 is formed such that the first end surface 40b is a bellows-like corrugated surface extending radially outward, i.e. an axial cross-section of the first end surface 40b has a sinusoidal shape. The inward facing surface 21a of the first core base 21 is fitted to the first end surface 40b of the field member 40. Thus, the inward facing surface 21a of the first core base 21 is a surface not perpendicular to the axial direction and the surface area thereof increases.

Similarly, as shown in FIG. 14, the second core base 31 includes the inward facing surface 31a and is formed such that the inward facing surface 31a is a bellows-like corrugated surface extending radially outward, i.e. an axial cross-section of the inward facing surface 31a has a sinusoidal shape. Further, the field member 40 is formed such that the second end surface 40c is a bellows-like corrugated surface extending radially outward, i.e. an axial cross-section of the second end surface 40c has a sinusoidal shape. The inward facing surface 31a of the second core base 31 is fitted to the second end surface 40c of the field member 40. Thus, the inward facing surface 31a of the second core base 31 is a surface not perpendicular to the axial direction and the surface area thereof increases.

This increases the surface area of a surface of the field member 40 held in contact with the first core base 21 and that of a surface of the field member 40 held in contact with the second core base 31 and reduces magnetic resistance when the field member 40 is sandwiched between the first rotor core 20 and the second rotor core 30.

Therefore, the third embodiment has advantages similar to those of the second embodiment.

Fourth Embodiment

Next, a fourth embodiment of the present disclosure will be described. The fourth embodiment is characterized by the shape of a field member 40 as in the third embodiment and, in conformity with this shape, is characterized by inward facing surfaces 21a, 31a of a first core base 21 and a second core base 31. In the following description, characteristic parts different from the second embodiment are described in detail and other common parts are omitted for the illustrative purposes.

Figure 15:
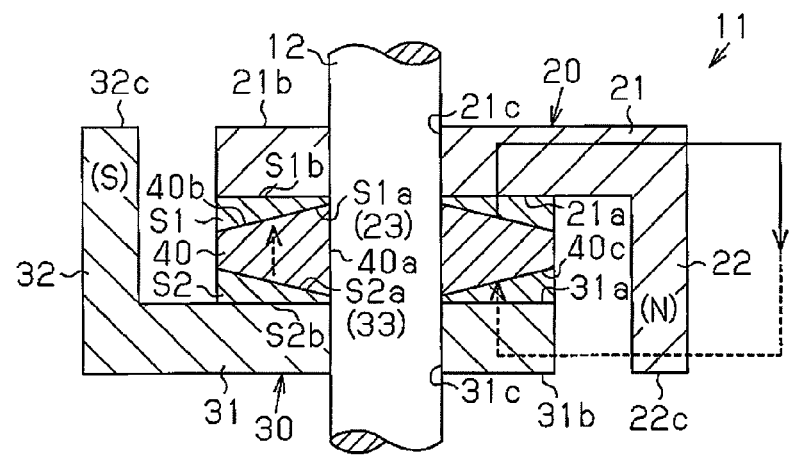
FIG. 15 is a cross-sectional view showing a rotor of a fourth embodiment.

As shown in FIG. 15, the inward facing surface 21a of the first core base 21 and the inward facing surface 31a of the second core base 31 are flat surface perpendicular to the axial direction. A first spacer S1, which is a magnetic member, is provided between the inward facing surface 21a and the field member 40, and a second spacer S2, which is a magnetic member, is provided between the inward facing surface 31a and the field member 40.

A surface S1b of the first spacer S1 facing the inward facing surface 21a is formed as a flat surface. A surface S1a of the first spacer S1 facing the field member 40 is formed as a truncated conical recessed surface in conformity with the shape of a first fitting protrusion 44 of the field member 40, i.e. the shape of a first end surface 40b. In the fourth embodiment, the surface S1a of the first spacer S1 recessed to have a truncated conical shape defines a first fitting recess 23.

Accordingly, the first end surface 40b of the field member 40 facing the first spacer S1, i.e., located on the side corresponding to the first core base 21, is a surface not perpendicular to the axial direction and the surface area thereof increases.

A surface S2b of the second spacer S2 facing the inward facing surface 31a is formed as a flat surface. A surface S2a of the second spacer S2 facing the field member 40 is formed as a truncated conical recessed surface in conformity with the shape of a second fitting protrusion 45 of the field member 40, i.e., the shape of a second end surface 40c. In the fourth embodiment, the surface S2a of the second spacer S2 recessed to have a truncated conical shape defines a second fitting recess 33.

Accordingly, the second end surface 40c of the field member 40 facing the second spacer S2, i.e. located on the side corresponding to the second core base 31 is a surface not perpendicular to the axial direction and the surface area thereof increases.

That is, when the field member 40 is sandwiched between the first rotor core 20 and the second rotor core 30 via the first spacer S1 and the second spacer S2, the surface area of a surface of the field member 40 held in contact with the first spacer S1 and that of a surface of the field member 40 held in contact with the second spacer S2 increase and the magnetic resistance is reduced.

Thus, in addition to the advantages of the second embodiment the fourth embodiment increases magnetic flux densities for the first core base 21 and the second core base 31 and increases the output of the motor 1 without changing the shapes of the first rotor core 20 and the second rotor core 30.

The above embodiments may be modified as follows.

In the second embodiment, the opposite end surfaces 40b, 40c of the field member 40 are entirely formed as the protrusions having the truncated conical shapes. In conformity with these truncated conical shapes, the entire inward facing surface 21a of the first core base 21 and the entire inward facing surface 31a of the second core base 31 are formed as the recesses having the truncated conical shapes. Without being limited to this, the second embodiment may be so modified that a part of the first end surface 40b of the field member 40 and a part of the second end surface 40c of the field member 40 are formed as protrusions having truncated conical shapes. In conformity with these truncated conical shapes, a part of the inward facing surface 21a of the first core base 21 and a part of the inward facing surface 31a of the second core base 31 are formed as recesses having truncated conical shapes.

In the second embodiment, the opposite end surfaces 40b, 40c of the field member 40 are formed as the protrusions having the truncated conical shapes. In conformity with these truncated conical shapes, the inward facing surfaces 21a, 31a of the first core base 21 and the second core base 31 are formed as the recesses having the truncated conical shapes. Without being limited to this, the second embodiment may be so modified that the opposite end surfaces 40b, 40c of the field member 40 are formed as protrusions having truncated pyramidal shapes. In conformity with these truncated pyramidal shapes, the inward facing surface 21a of the first core base 21 and the inward facing surface 31a of the second core base 31 are formed as recesses having truncated pyramidal shapes.

The second embodiment may also be so modified that partial surfaces of the truncated pyramidal shapes are curved surfaces.

In the third embodiment, the opposite end surfaces 40b, 40c of the field member 40 are formed to have the bellows-like shapes extending radially outward, i.e., the axial cross-sections of the opposite end surfaces 40b, 40c are formed to have the sinusoidal shapes. In conformity with these shapes, the inward facing surface 21a of the first core base 21 and the inward facing surface 31a of the second core base 21 are formed to have the bellows-like shapes.

Without being limited to this, the third embodiment may be so modified that the opposite end surfaces 40b, 40c of the field member 40 are formed to have sawtooth-like shapes extending radially outward. In conformity with these shapes, the inward facing surface 21a of the first core base 21 and the inward facing surface 31a of the second core base 31 are formed to have sawtooth-like shapes.

The third embodiment may also be so embodied that sawtooth-like surfaces are formed on parts of the opposite end surfaces 40b, 40c of the field member 40. In conformity with these sawtooth-like shapes, sawtooth-like surfaces are formed on a part of the inward facing surface 21a of the first core base 21 and a part of the inward facing surface 31a of the second core base 31.

In the third embodiment, the opposite end surfaces 40b, 40c of the field member 40 are formed to have the bellows-like shapes extending radially outward. In conformity with these shapes, the inward facing surface 21a of the first core base 21 and the inward facing surface 31a of the second core base 31 are formed to have the bellows-like shapes.

Without being limited to this, the third embodiment may be so modified that the opposite end surfaces. 40b, 40c of the field member 40 are formed as bellows-like or sawtooth-like surfaces circling around in the circumferential direction in conformity with these bellows-like or sawtooth-like surfaces, the inward facing surface 21a of the first core base 21 and the inward facing surface 31a of the second core base 31 are formed as bellows-like or sawtooth-like surfaces circling around in the circumferential direction.

Fifth Embodiment

A fifth embodiment of the present disclosure will now be described with reference to the drawings.

Figure 16:
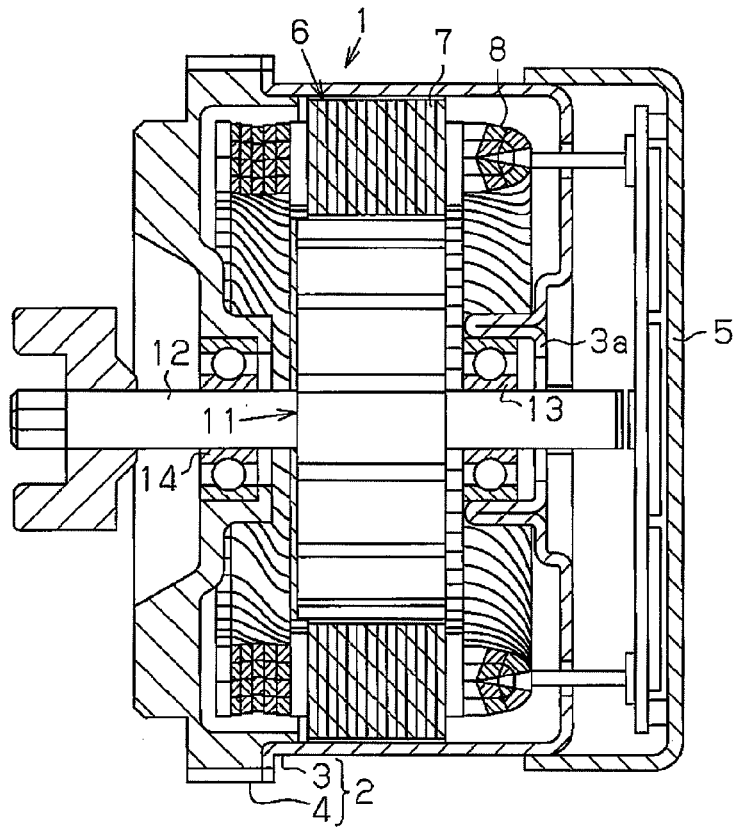
FIG. 16 is a cross-sectional view of a motor of a fifth embodiment.
Figure 17:
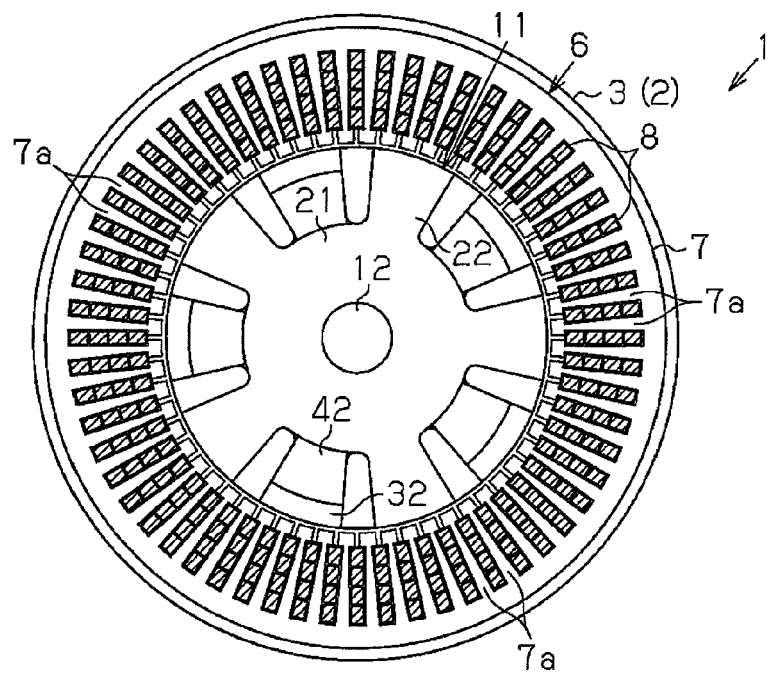
FIG. 17 is a plan view of the motor of FIG. 16.

As shown in FIGS. 16 and 17, a motor case 2 of a motor 1 includes a cylindrical housing 3 in the form of a tube with a closed end and a front end plate 4 for closing an opening at a front side of the cylindrical housing 3, i.e. located on a left side in FIG. 16. A circuit storage box storing a power supply circuit such as a circuit, board is mounted on a rear side of the cylindrical housing 3, i.e., on an end part located on a right, side in FIG. 16. A stator 6 is fixed to the inner peripheral surface of the cylindrical housing 3. The stator 6 includes an armature core 7 with a plurality of teeth 7a extending radially inward and a segment conductor (SC) coil 8 wound on the teeth 7a of the armature core 7. A rotor 11 of the motor 1 includes a rotary shaft 12 and is arranged inside the stator 6. The rotary shaft 12 is a cylindrical metal shaft made of magnetic material and rotationally supported by a bearing 13 supported on a bottom part 3a of the cylindrical housing 3 and a bearing 14 supported on the front end plate 4.

Figure 18:
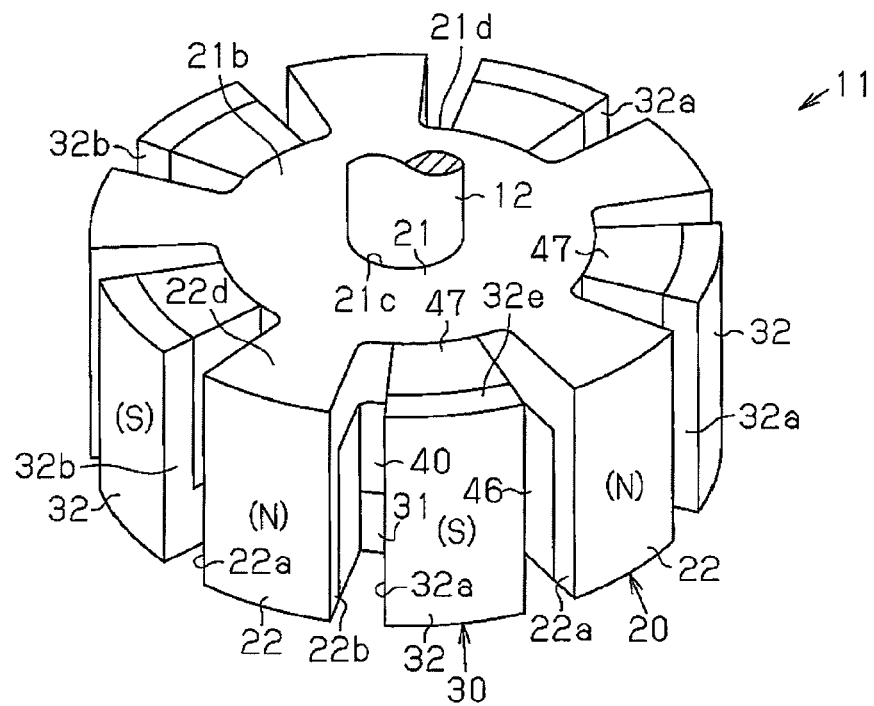
FIG. 18 is a perspective view of a rotor of FIG. 16.
Figure 19:
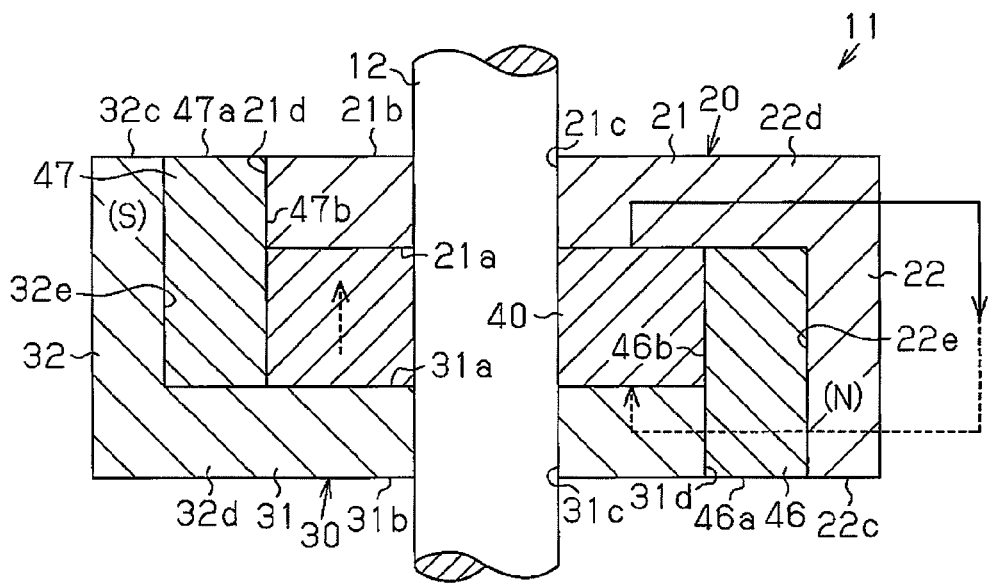
FIG. 19 is a cross-sectional view of the rotor of FIG. 18.
Figure 20:
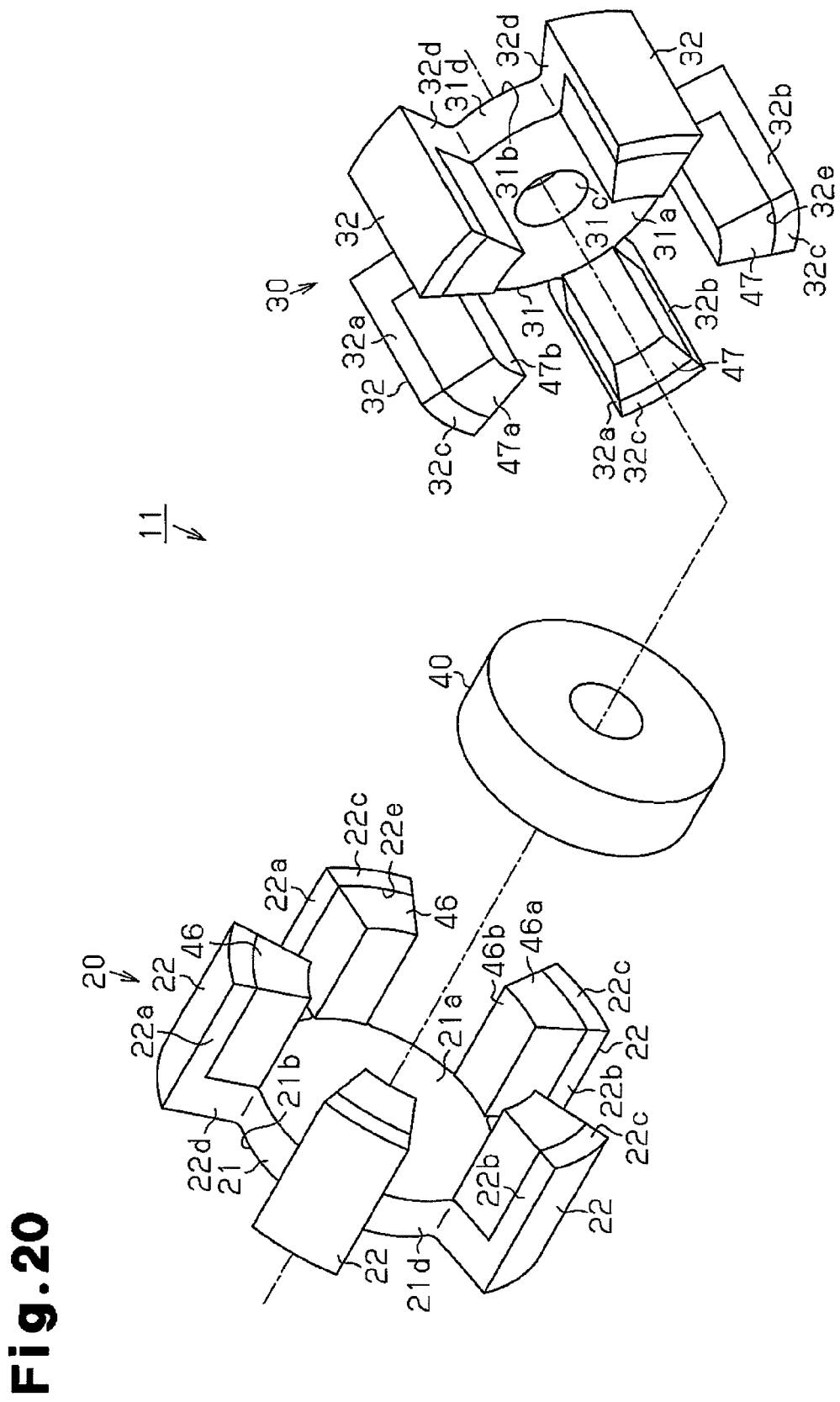
FIG. 20 is an exploded perspective view of the rotor of FIG. 18.
Figure 21:
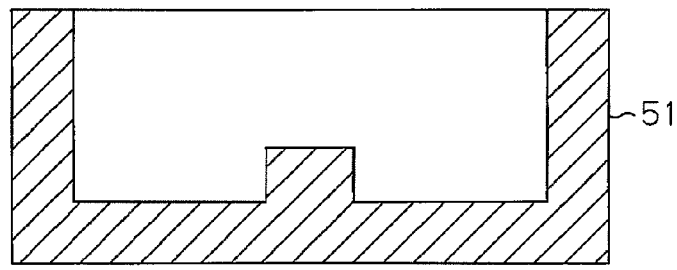
FIGS. 21(a) to 21(d) are diagrams showing a manufacturing method for the rotor of FIG. 18.
Figure 21:
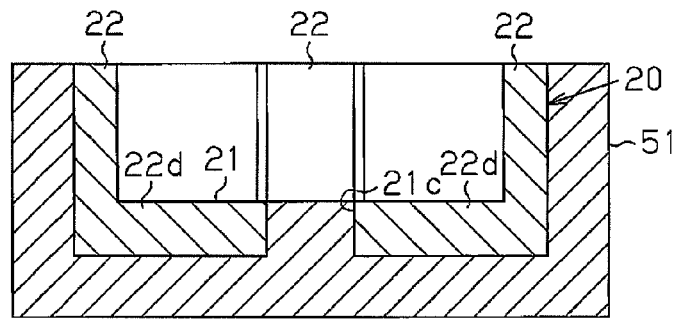
Figure 21:
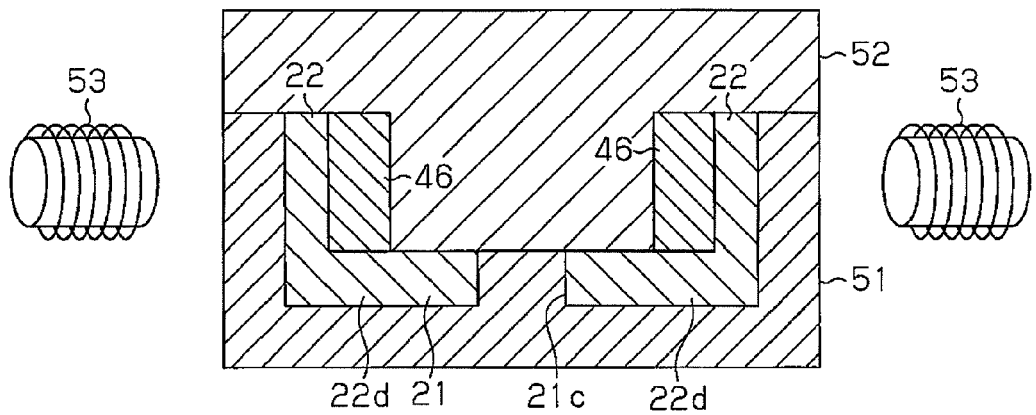
Figure 21:
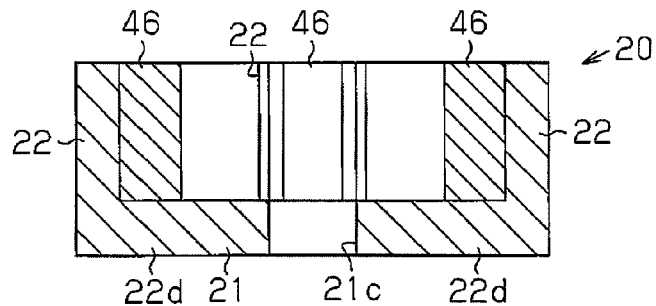
Figure 22A:
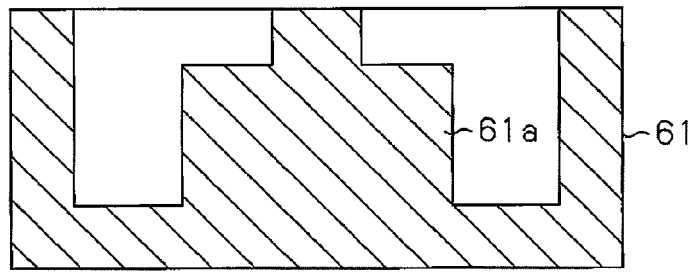
FIGS. 22(a) to 22(d) are diagrams showing a manufacturing method for a rotor of a modification.
Figure 22B:
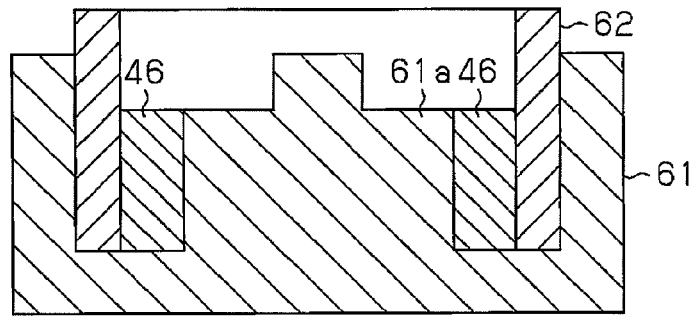
Figure 22C:
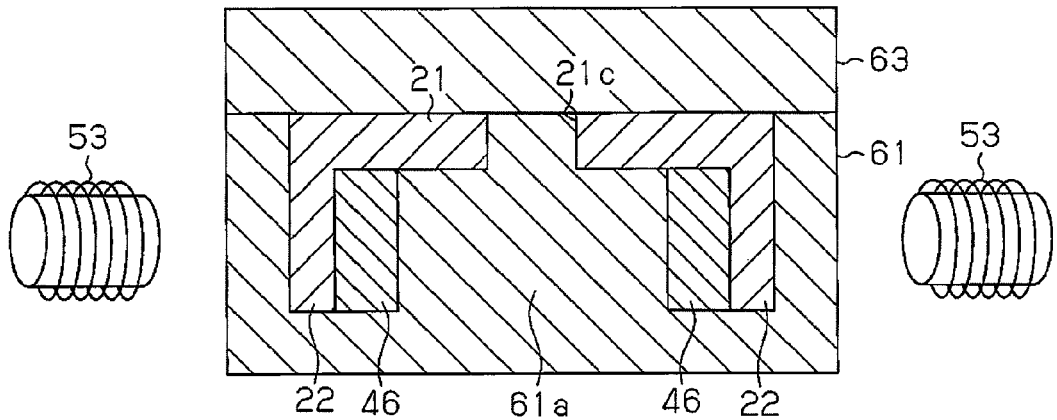
Figure 22D:
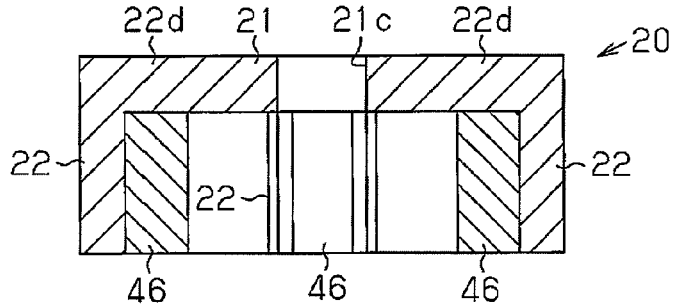

As shown in FIGS. 18, 19 and 20, the rotor 11 includes the rotary shaft 12, a first rotor core 20, a second rotor core 30, an annular field member 40 as a field magnet, primary back magnets 46 and secondary back magnets 47 as auxiliary magnets.

The first rotor core 20 includes a substantially disk-shaped first core base 21. A shaft hole 21c into which the rotary shaft 12 is inserted is formed to extend through a central part of the first core base 21 in the axial direction. The rotary shaft 12 is press-fitted and fixed into the shaft hole 21c. This enables the first rotor core 20 and the rotary shaft 12 to integrally rotate.

A plurality of primary claw-shaped magnetic poles 22 are so formed at equal intervals on an outer peripheral part of the first core base 21 as to protrude radially outward and extend in the axial direction. In the fifth embodiment, there are five primary claw-shaped magnetic poles 22. Circumferential end surfaces 22a, 22b of the primary claw-shaped magnetic pole 22 are flat surfaces extending in a radial direction and not inclined with respect to the radial direction when viewed in the axial direction. The primary claw-shaped magnetic pole 22 has a sectoral cross-section in a direction perpendicular to the axis. The angle of each primary claw-shaped magnetic pole 22 in the circumferential direction, i.e. the angle between the circumferential end surfaces 22a and 22b is set to be smaller than the angle of the clearance between the primary claw-shaped magnetic poles 22 adjacent in the circumferential direction.

The primary back magnet 46 is provided on a back surface 22e, i.e. on a radially inner surface of each primary claw-shaped magnetic pole 22. The primary back magnet 46 is formed integrally with each primary claw-shaped magnetic pole 22 of the first rotor core 20 by insert molding. That is, as shown in FIG. 20, the first rotor core 20 and the respective primary back magnets 46 are formed as an integral component. As shown in FIG. 19, the primary back magnet 46 is held in close contact with the back surface 22e of the primary claw-shaped magnetic pole 22 in the radial direction and held in close contact with a radially extending portion 22d of the primary claw-shaped magnetic pole 22, i.e. a part radially extending from the first core base 21 in the axial direction by being formed integrally with the primary claw-shaped magnetic pole 22. This primary back magnet 46 is formed such that a cross-section thereof in a direction perpendicular to the axis is sectoral and opposite circumferential end surfaces thereof are respectively flat surfaces flush with the circumferential end surfaces 22a, 22b of the primary claw-shaped magnetic pole 22. An axial tip end surface 46a of the primary back magnet 46, i.e., an end surface of the primary back magnet 46 located at a side opposite to the radially extending portion 22d is formed to be flush with a tip end surface 22c of the primary claw-shaped magnetic pole 22.

As shown in FIGS. 19 and 20, the second rotor core 30 has the same shape as the first rotor core 20. A shaft hole 31c into which the rotary shaft 12 is inserted is formed in a central part of a substantially disk-shaped second core base 31. The rotary shaft 12 is press-fitted and fixed into the shaft hole 31c. This enables the second rotor core 30 and the rotary shaft 12 to integrally rotate.

A plurality of secondary claw-shaped magnetic poles 32 are so formed at equal intervals on an outer peripheral part of the second core base 31 as to protrude radially outward and extend in the axial direction. Circumferential end surfaces 32a, 32b of the secondary claw-shaped magnetic pole 32 are radially extending flat surfaces. The secondary claw-shaped magnetic pole 32 has a sectoral cross-section in a direction perpendicular to the axis. The angle of each secondary claw-shaped magnetic pole 32 in the circumferential direction, i.e., the angle between the circumferential end surfaces 32a and 32b is set to be smaller than the angle of the clearance between the secondary claw-shaped magnetic poles 32 adjacent in the circumferential direction.

The secondary back magnet 47 is provided on a back surface 32e i.e., on a radially inner surface of each secondary claw-shaped magnetic pole 32. The secondary back magnet 47 is formed integrally with each secondary claw-shaped magnetic pole 32 of the second rotor core 30 by insert molding. That is, as shown in FIG. 20, the second rotor core 30 and the respective secondary back magnets 47 are formed as an integral component. As shown in FIG. 19, the secondary back magnet 47 is held in close contact with the back surface 32e of the secondary claw-shaped magnetic pole 32 in the radial direction and held in close contact with a radially extending portion 32d of the secondary claw-shaped magnetic pole 32, i.e., a part radially extending from the second core base 31 in the axial direction by being formed integrally with the secondary claw-shaped magnetic pole 32. This secondary back magnet 47 is formed such that a cross-section thereof in the direction perpendicular to the axis is sectoral and opposite circumferential end surfaces thereof are respectively flat surfaces flush with the circumferential end surfaces 32a, 32b of the secondary claw-shaped magnetic pole 32. An axial tip end surface 47a of the secondary back magnet 47. i.e. an end surface of the secondary back magnet 47 located at a side opposite to the radially extending portion 32d is formed to be flush with a tip end surface 32c of the secondary claw-shaped magnetic pole 32.

The second rotor core 30 is assembled with the first rotor core 20 such that each secondary claw-shaped magnetic pole 32 is arranged between corresponding primary claw-shaped magnetic poles 22. Specifically, the primary claw-shaped magnetic poles 22 and the secondary claw-shaped magnetic poles 32 are so formed that one circumferential end surface 22a of the primary claw-shaped magnetic pole 22 and the other circumferential end surface 32b of the secondary claw-shaped magnetic pole 32 are parallel to each other in the axial direction. This causes the clearance between the respective circumferential end surfaces 22a, 32b to be substantially straight in the axial direction. Similarly, the primary claw-shaped magnetic poles 22 and the secondary claw-shaped magnetic poles 32 are so formed that the other circumferential end surface 22b of the primary claw-shaped magnetic pole 22 and one circumferential end surface 32a of the secondary claw-shaped magnetic pole 32 are parallel to each other in the axial direction. This causes the clearance between the respective circumferential end surfaces 22b, 32a to be substantially straight in the axial direction.

A radially inner surface 46b of the primary back magnet 46 integrally formed to the primary claw-shaped magnetic pole 22 is held in contact with an outer peripheral surface 31d of the second core base 31 in a radial direction. Similarly, a radially inner surface 46b of the secondary back magnet 47 integrally formed to the secondary claw-shaped magnetic pole 32 is held in contact with an outer peripheral surface 21d of the first core base 21 in a radial direction. That is, the primary back magnet 46 is located between the second core base 31 and the primary claw-shaped magnetic pole 22 in the radial direction, and the secondary back magnet 47 is located between the first core base 21 and the secondary claw-shaped magnetic pole 32 in the radial direction. The tip end surface 22c of the primary claw-shaped magnetic pole 22 and the axial tip end surface 46a of the primary back magnet 46 are formed to be flush with an outward facing surface 31b, which is an axial outer end surface of the second core base 31. Similarly, the tip end surface 32c of the secondary claw-shaped magnetic pole 32 and the axial tip end surface 47a of the secondary back magnet 47 are formed to be flush with an outward facing surface 21b, which is an axial outer end surface of the first core base 21.

The field member 40, which is an annular magnet, is arranged and sandwiched between the first core base 21 and the second core base 31 in the axial direction. The field member 40 is in the form of a circular ring and the rotary shaft 12 extends through a central part thereof. The field member 40 is held in close contact with an inward facing surface 21a, which is an axial inner end surface of the first core base 21, and an inward facing surface 31a, which is an axial inner end surface of the second core base 31, respectively. The inward facing surface 21a of the first core base 21, the inward facing surface 31a of the second core base 31 and opposite axial end surfaces of the field member 40 are flat surfaces perpendicular to an axis of the rotary shaft 12. The outer peripheral surface of the field member 40 is held in contact with the radially inner surfaces 46b of the primary back magnets 46 and the radially inner surfaces 47b of the secondary back magnets 47 in radial directions. That is, the primary back magnet 46 is located between the field member 40 and the primary claw-shaped magnetic pole 22 in the radial direction and the secondary back magnet 47 is located between the field member 40 and the secondary claw-shaped magnetic pole 32 in the radial direction.

The field member 40 is magnetized in the axial direction to cause the primary claw-shaped magnetic poles 22 to function as primary magnetic poles and the secondary claw-shaped magnetic poles 32 to function as secondary magnetic poles. In this embodiment, the primary magnetic poles are north poles and the secondary magnetic poles are south poles. Accordingly, the rotor 11 of this embodiment is a rotor having a Lundell-type structure using the annular field member 40 as an annular magnet. In the rotor 11, the primary claw-shaped magnetic poles 22 serving as north poles and the secondary claw-shaped magnetic poles 32 serving as south poles are alternately arranged in the circumferential direction and there are ten magnetic poles, i.e., there are five pole pairs. Since the number of the pole pairs is an odd number greater than or equal to three, the claw-shaped magnetic poles having the same polarity are not at opposite positions spaced apart by 180° in the circumferential direction in each rotor core. Thus, such an arrangement of the claw-shaped magnetic poles is stable against magnetic vibration.

The primary back magnet 46 is magnetized in the radial direction such that a surface held in contact with the primary claw-shaped magnetic pole 22, i.e. a radially outer surface serves as a north pole having the same polarity as the primary claw-shaped magnetic pole 22 and a surface held in contact with the second core base 31, i.e. a radially inner surface serves as a south pole having the same polarity as the second core base 31. Similarly, the secondary back magnet 47 is magnetized in the radial direction such that a surface held in contact with the secondary claw-shaped magnetic pole 32, i.e., a radially outer surface serves as a south pole having the same polarity as the secondary claw-shaped magnetic pole 32 and a surface held in contact with the first core base 21, i.e. a radially inner surface serves as a north pole having the same polarity as the first core base 21. The magnetic flux of the primary back magnet 46 flows into the primary claw-shaped magnetic pole 22 and the magnetic flux of the secondary back magnet 47 flows into the secondary claw-shaped magnetic pole 32. These magnetic fluxes contribute to the generation of torque of the rotor 11.

In the motor 1 configured as described above, a magnetic field for rotating the rotor 11 is generated in the stator 6 and the rotor 11 is rotated when a three-phase drive current is supplied to the segment conductor (SC) coil 3 via the power supply circuit in the circuit storage box 5.

Next, operation of the fifth embodiment will now be described.

The primary back magnet 46 is located in the clearance in the radial direction between the back surface 22e of the primary claw-shaped magnetic pole 22 and the second core base 31. The secondary back magnet 47 is located in the clearance in the radial direction between the back surface 32e of the secondary claw-shaped magnetic pole 32 and the first core base 21. In this way, leakage magnetic flux from the clearance of the back surface 22e of the primary claw-shaped magnetic pole 22 and that from the clearance of the back surface 32e of the secondary claw-shaped magnetic pole 32 are respectively suppressed by the primary back magnet 46 and the secondary back magnet 47.

The primary back magnets 46 are formed integrally with the first rotor core 20 and the secondary back magnets 47 are formed integrally with the second rotor core 30. That is, the first rotor core 20 and the primary back magnets 46 are formed as an integral component, and the second rotor core 30 and the secondary back magnets 47 are formed as another integral component. In this way, in the fifth embodiment, the number of components is reduced as compared with a configuration as a comparative example in which the first rotor core 20, the second rotor core 30, the field member 40, the primary back magnets 46 and the secondary back magnets 47 are all separate bodies. As a result, the number of component assembling steps is reduced and, consequently, the fifth embodiment contributes to the reduction in component assembling cost.

Next, a method for manufacturing the rotor 11 of the fifth embodiment will be described. A method for manufacturing an integral molding product of the first rotor core 20 and the primary back magnets 46 is mainly described below in accordance with FIGS. 21(a) to 21(d). FIGS. 21(a) to 21(d) planarly show cross-sections bent at a predetermined angle to pass through circumferential centers of two primary claw-shaped magnetic poles 22.

FIG. 21(a) shows a first mold 51 as a recessed mold for producing the integral molding product of the first rotor core 20 and the primary back magnets 46.

First, as shown in FIG. 21(b), the already formed first rotor core 20 is arranged in the first mold 51.

Subsequently, as shown in FIG. 21(c), a second mold 52 as a protruding mold is arranged above the first mold 51. Subsequently, after cavities formed between the second mold 52 and the back surfaces 22e of the primary claw-shaped magnetic poles 22 are filled with a mixture of magnetic powder and resin material, the primary back magnets 46 made of bonded magnet are formed by solidifying the mixture. In this way, the primary back magnets 46 are formed integrally with the first rotor core 20 so as to be held in close contact with and fixed to the back surfaces 22e and the radially extending portions 22d of the primary claw-shaped magnetic poles 22.

Subsequently, magnetizers 53 for generating a magnetic field magnetize the primary back magnets 46. By this magnetization, the primary back magnets 46 are magnetized in the radial direction so that the radially outer surfaces, i.e. the surfaces facing the primary claw-shaped magnetic poles 22 serve as north poles and the radially inner surfaces serve as south poles. Thereafter, the finished product of the integral molding product of the first rotor core 20 and the primary back magnets 46 shown in FIG. 21(*d*) is removed from the first mold 51 and the second mold 52.

An integral molding product of the second rotor core 30 and the secondary back magnets 47 is also produced in a procedure similar to the above. A direction of magnetization of the secondary back magnets 47 is opposite to that of the primary back magnets 46, i.e. the radially outer surfaces are magnetized to be south poles and the radially inner surfaces are magnetized to be north poles.

Subsequently, the integral molding product composed of the first rotor core 20 and the primary back magnets 46 and the integral molding product composed of the second rotor core 30 and the secondary back magnets 47 are assembled to sandwich the field member 40 therebetween and arrange each secondary claw-shaped magnetic pole 32 between corresponding primary claw-shaped magnetic poles 22 in the circumferential direction. Thereafter, the rotary shaft 12 is press-fitted and fixed into the shaft holes 21*c* of the first core base 21 and the shaft hole 31*c* of the second core base 31, whereby the rotor 11 shown in FIGS. 18 and 19 is completed.

Next, a characteristic advantage of the fifth embodiment will be described.

(6) The rotor 11 includes the primary back magnets 46 arranged in the clearances formed by the back surfaces 22*e* of the primary claw-shaped magnetic poles 22 and the secondary back magnets 47 arranged in the clearances formed by the back surfaces 32*e* of the secondary claw-shaped magnetic poles 32. The primary back magnets 46 are formed integrally with the first rotor core 20 and the secondary back magnets 47 are formed integrally with the second rotor core 30. That is, the first rotor core 20 and the primary back magnets 46 are formed as an integral component and the second rotor core 30 and the secondary back magnets 47 are formed as a different integral component. Thus, the number of components is suppressed in the fifth embodiment as compared with a configuration as a comparative example in which the first rotor core 20, the second rotor core 30, the field member 40, the primary back magnets 46 and the secondary back magnets 47 are all separate bodies. As a result, the number of component assembling steps is suppressed and, consequently, the fifth embodiment contributes to a reduction in component assembling cost. Further, the primary back magnets 46 suppress leakage magnetic fluxes from the clearances formed by the back surfaces 22*e* of the primary claw-shaped magnetic poles 22 and the secondary back magnets 47 suppress leakage magnetic fluxes from the clearances formed by the back surfaces 32*e* of the secondary claw-shaped magnetic poles 32.

The fifth embodiment of the present disclosure may be modified as follows.

In the fifth embodiment, the integral molding product composed of the first rotor core 20 and the primary back magnets 46 is formed by insert molding using the first rotor core 20 and the second rotor core 30 as inserts. However, besides this, the first rotor core 20 and the primary back magnets 46 may be integrally formed by two-color molding.

An example of a manufacturing method by two-color molding will be described in accordance with FIGS. 22(*a*) to 22(*d*). Similar to FIGS. 21(*a*) to 21(*d*), FIGS. 22(*a*) to 22(*d*) also show cross-sections bent at a predetermined angle to pass through circumferential centers of two primary claw-shaped magnetic poles 22.

FIG. 22(*a*) shows a first mold 61 as a recessed mold for producing the integral molding product of the first rotor core 20 and the primary back magnets 46 by two-color molding.

First, as shown in FIG. 22(*b*), a cylindrical second mold 62 is arranged in the first mold 61. Then, cavities formed between the inner peripheral surface of the second mold 62 and a cylindrical central extending portion 61*a* of the first mold 61 is filled with hard magnetic powder, which will form the primary back magnets 46.

Subsequently, the second mold 62 is removed and the space between the inner peripheral surface of the first mold 61 and the primary back magnets 46 is filled with soft magnetic powder, which will form the first rotor core 20 as shown in FIG. 22(*c*). Thereafter, a third mold 63 in the form of a flat plate is arranged on top of the first mold 61 and the soft magnetic powder and the hard magnetic powder are compressed by the third mold 63 (compression molding). Thereafter, the integral molding product of the first rotor core 20 and the primary back magnets 46 is formed by heating the soft magnetic powder and the hard magnetic powder. That is, the first rotor core 20 is formed by a powder magnetic core.

Subsequently, magnetizers 53 for generating a magnetic field magnetize the primary back magnets 46. By this magnetization, the primary back magnets 46 are magnetized in the radial direction so that the radially outer surfaces, i.e., the surfaces facing the primary claw-shaped magnetic poles 22 serve as north poles and the radially inner surfaces serve as south poles. Thereafter, the finished, product of the integral molding product of the first rotor core 20 and the primary back magnets 46 shown in FIG. 22(*d*) is removed from the first mold 61 and the third mold 63.

An integral molding product of the second rotor core 30 and the secondary back magnets 47 is also produced in a procedure similar to the above. A direction of magnetization of the secondary hack magnets 47 is opposite to that of the primary back magnets 46, i.e. the radially outer surfaces are magnetized to be south poles and the radially inner surfaces are magnetized to be north poles.

According to this manufacturing method, the first rotor core 20 and the second rotor core 30 can be compression molded together with the primary back magnets 46 and the secondary back magnets 47 since the first rotor core 20 and the second rotor core 30 are formed by the powder magnetic cores. This simplifies a manufacturing process. Since the first rotor core 20 and the primary back magnets 46 are integrally formed by two-color molding, the integrity of the first rotor core 20 and the primary back magnets 46 is improved.

In the rotor 11 of the fifth embodiment, the primary back magnets 46 and the first rotor core 20 are integrally formed. However, the rotor 11 is not particularly limited to this configuration. For example, the rotor 11 may be so configured that the first rotor core 20, the second rotor core 30 and the field member 40 are integrally formed. In this case, the rotor 11 may be so configured that the primary back magnets 46 and the secondary back magnets 47 are fixed to the primary claw-shaped magnetic poles 22 such as by adhesion. Further, the primary back magnets 46 and the secondary back magnets 47 may be omitted and the rotor 11 may be composed of the first rotor core 20, the second rotor core 30 and the field member 40. Further, the rotor 11 may be so configured that the first rotor core 20, the second rotor core 30 and the field member 40 are integrally formed. Further, the rotor 11 may be so configured that the field member 40 is formed integrally with either one of the first rotor core 20 and the second rotor core 30.

According to such a configuration, the field member 40 and at least one of the first rotor core 20 and the second rotor core 30 are formed as an integral component. Thus, the number of components is suppressed as compared with a configuration as a comparative example in which all the constituent components of the rotor 11 are separate bodies. Therefore, the number of component assembling steps can be suppressed and, consequently, component assembling cost can be reduced.

Sixth Embodiment

Figure 23:
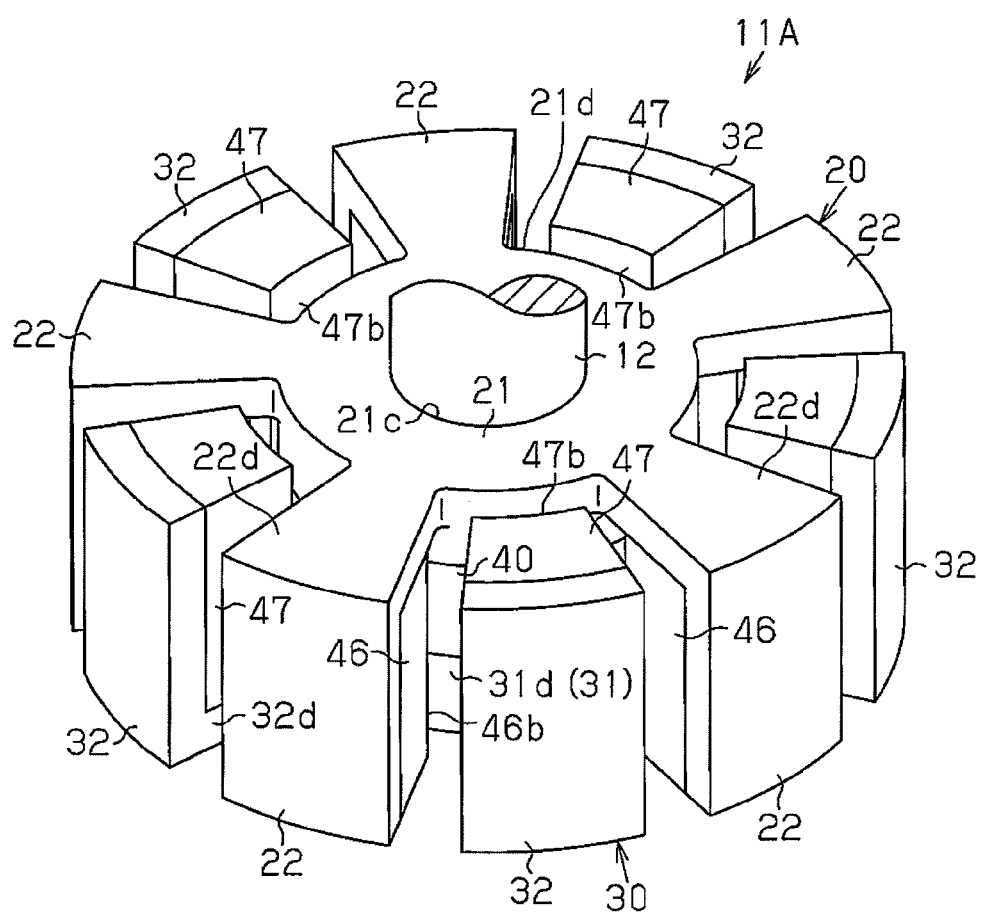
FIG. 23 is a perspective view of a rotor of a sixth embodiment.

A rotor 11A of a sixth embodiment shown in FIG. 23 is configured such that all of a first rotor core 20, a second rotor core 30, a field member 40, primary back magnets 46 and secondary back magnets 47 are integrally formed. Components similar to those of the fifth embodiment are denoted by the same reference signs and not described in detail.

Figure 24A:
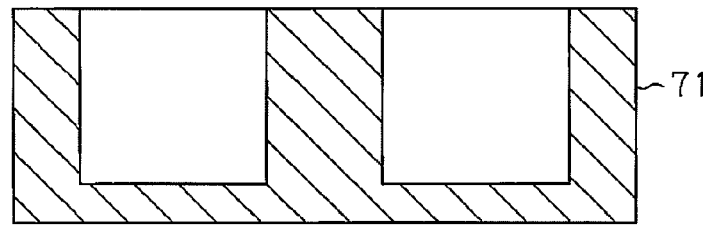
FIGS. 24(a) to 24(d) are diagrams showing a manufacturing method for the rotor of FIG. 23.
Figure 24B:
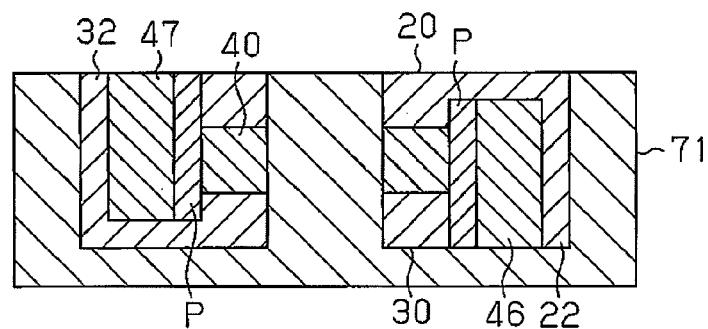
Figure 24C:
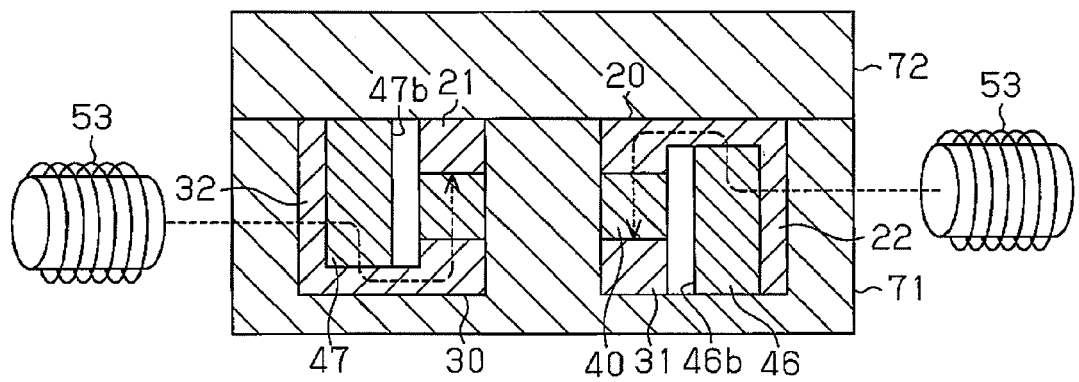
Figure 24D:
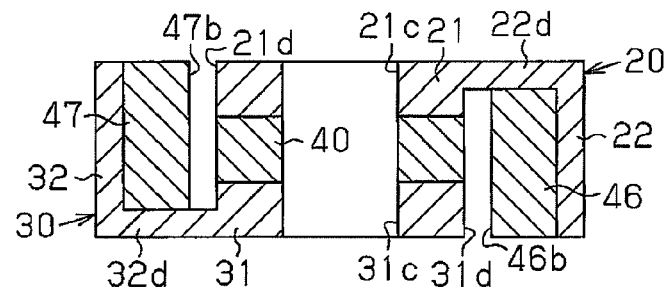

As shown in FIGS. 23 and 24(d), in the rotor 11A of the sixth embodiment, a radially inner surface 46b of each primary back magnet 46 is radially separated from the outer peripheral surface of the field member 40 and an outer peripheral surface 31d of a second core base 31. Similarly, a radially inner surface 47b of each secondary back magnet 47 is radially separated from the outer peripheral surface of the field member 40 and an outer peripheral surface 21d of a first core base 21. The outer peripheral surface 21d of the first core base 21, the outer peripheral surface 31d of the second core base 31 and the outer peripheral surf ace of the field member 40 are formed to have the same diameter.

Next, a method for manufacturing the rotor 11A of the sixth embodiment will be described.

FIG. 24(a) shows a first mold 71 as a recessed mold for manufacturing an integral molding product composed of the first rotor core 20, the second rotor core 30, the field member 40, the primary back magnets 46 and the secondary back magnets 47 by two-color molding.

First, as shown in FIG. 24(b), the first mold 71 is filled in a predetermined fashion with soft magnetic powder, which will form the first rotor core 20 and the second rotor core 30, hard magnetic powder, which will form the field member 40, the primary back magnets 46 and the secondary back magnets 47, and disappearing powder P made of sublimate such as naphthalene.

Next, a second mold 72 in the form of a flat plate is arranged on top of the first mold 71 and the powders filling the first mold 71 are compressed by the second mold 72 (compression molding). Thereafter, an integral component composed of the first rotor core 20, the second rotor core 30, the field member 40 and the primary back magnets 46 and the secondary back magnets 47 is formed as shown in FIG. 24(c) by heating the soft magnetic powder, the hard magnetic powder and the disappearing powder P. That is, the first rotor core 20 and the second rotor core 30 are formed by powder magnetic cores. The disappearing powder P, e.g. naphthalene is sublimated by this heating, and radial clearances are formed between the radially inner surfaces 46b of the primary back magnets 46 and the field member 40 and the second core base 31 and other radial clearances are formed between the radially inner surfaces 47b of the secondary back magnets 47 and the field member 40 and the first core base 21 by this sublimation.

Subsequently, magnetizers 53 for generating a magnetic field magnetize the primary back magnets 46, the secondary back magnets 47 and the field member 40. Magnetic fluxes from the magnetizers 53 arranged radially outwardly of the primary claw-shaped magnetic poles 22 pass the primary claw-shared magnetic poles 22 and the primary back magnets 46 in the radial direction, propagate radially inward through the first core base 21 from there, and pass the field member 40 in the axial direction. Similarly, magnetic fluxes from the magnetizers 53 arranged radially outwardly of the secondary claw-shaped magnetic poles 32, pass the secondary claw-shaped magnetic poles 32 and the secondary back magnets 47 in the radial direction, propagate radially inward through the second core base 31 from there, and pass the field member 40 in the axial direction. In this way, the primary back magnets 46 and the secondary back magnets 47 are magnetized to have mutually different polarities and the field member 40 is magnetized in the axial direction.

Thereafter, an integral molding product shown in FIG. 24(d) is removed from the first and second molds 71, 72 and the rotary shaft 12 is press-fitted and fixed into the shaft hole 21c of the first core base 21 and the shaft hole 31c of the second core base 31, whereby the rotor 11A shown in FIG. 23 is completed.

An advantage similar to the advantage (6) of the fifth embodiment is obtained also by the sixth embodiment. In addition, the primary back magnets 46, the secondary back magnets 47, the first rotor core 20, the second rotor core 30 and the field member 40 are formed as an integral component since they are integrally formed. As a result, the rotor 11A of the sixth embodiment is composed of a smaller number of components. Since the first rotor core 20 and the second rotor core 30 are formed by the powder magnetic cores in the sixth embodiment, the first rotor core 20 and the second rotor core 30 can be compression molded together with the field member 40, the primary back magnets 46 and the secondary back magnets 47. This simplifies a manufacturing process. Since the first rotor core 20, the second rotor core 30, the field member 40, the primary back magnets 46 and the secondary back magnets 47 are integrally formed by two-color molding, the integrity of the rotor 11A is improved.

The fifth and sixth embodiments of the present disclosure may be modified as follows.

In the sixth embodiment, sublimate such as naphthalene is used as the disappearing powder P. However, besides this, meltage or water-soluble matter such as sodium chloride may be used to replace the disappearing powder P.

Figure 25:
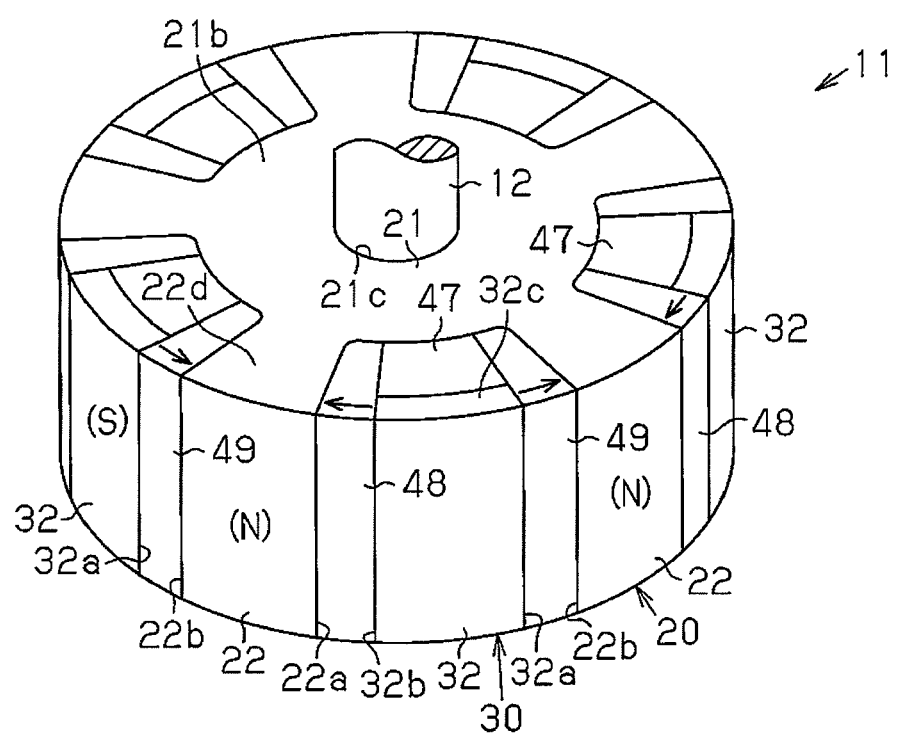
FIG. 25 is a perspective view of a rotor of a modification.

In the fifth and sixth embodiments, primary interpole magnets 48 and secondary interpole magnets 49 as shown in FIG. 25 may be provided as auxiliary magnets. FIG. 25 shows an example in which the primary interpole magnets 48 and the secondary interpole magnets 49 are provided in the rotor 11 of the fifth embodiment.

The primary interpole magnets 48 and the secondary interpole magnets 49 are arranged between the primary claw-shaped magnetic poles 22 and the secondary claw-shaped magnetic poles 32 in the circumferential direction. Specifically, the primary interpole magnet 48 is located between a flat surface formed by one circumferential end surface 22a of the primary claw-shaped magnetic pole 22 and the circumferential end surface of the primary back magnet 46 and a flat surface formed by the other circumferential end surface 32b of the secondary claw-shaped magnetic pole 32 and the circumferential end surface of the secondary back magnet 47. The secondary interpole magnet 49 has the same shape as the primary interpole magnet 48 and is located between a flat surface formed by the other circumferential end surface 22b of the primary claw-shaped magnetic pole 22 and the circumferential end surface of the primary back magnet 46 and a flat surface formed by one circumferential end surface 32a of the secondary claw-shaped magnetic pole 32 and the circumferential end surface of the secondary back magnet 47. The primary interpole magnets 48 and the secondary interpole magnets 49 are magnetized in the circumferential direction so that parts having the same polarities respectively face the primary claw-shaped magnetic poles 22 and the secondary claw-shaped magnetic poles 32, i.e. surfaces facing the primary claw-shaped magnetic poles 22 serve as north poles and surfaces facing the secondary claw-shaped magnetic poles 32 serve as south poles.

In such a configuration, the primary interpole magnets 48 and the secondary interpole magnets 49 are respectively formed integrally with the first rotor core 20 or the second rotor core 30 or both of the primary interpole magnets 48 and the secondary interpole magnets 49 are formed integrally with either one of the first rotor core 20 and the second rotor core 30. By doing so, the number of components is reduced as compared with a configuration as a comparative example in which all the constituent components of the rotor 11 are separate bodies. As a result, the number of component assembling steps is reduced and, consequently, this embodiment contributes to a reduction in the component assembling cost. Although the primary back magnets 46 are formed integrally with the first rotor core 20 and the secondary back magnets 47 are formed integrally with the second rotor core 30 in the fifth embodiment, only the primary interpole magnets 48 and the secondary interpole magnets 49 may be formed integrally with the first rotor core 20 and the second rotor core 30 in a modification. With the primary back magnets 46 and the secondary back magnets 47 omitted, the rotor 11A may be so configured that the primary interpole magnets 48 and the secondary interpole magnets 49 are respectively formed integrally with the first rotor core 20 and the second rotor core 30.

In the configuration in which the primary interpole magnets 48 and the secondary interpole magnets 49 are provided in the rotor 11A of the sixth embodiment, only one constituent component of the rotor 11A except the rotary shaft 12 can be achieved if all the constituent components of the rotor 11A except the rotary shaft 12, i.e. the first rotor core 20, the second rotor core 30, the field member 40, the primary back magnets 46, the secondary back magnets 47, the primary interpole magnets 48 and the secondary interpole magnets 49 are integrally formed. This configuration is more effective.

The number of poles of the stator 6 the number of poles of the rotor 11, the numbers of, e.g., the primary claw-shaped magnetic poles 22 and the secondary claw-shaped magnetic poles 32 in each of the above embodiments may be appropriately changed according to the configuration.

In each of the above embodiments, the shapes of the first rotor core 20 and the second rotor core 30 may be appropriately changed according to the configuration.

In the fifth and sixth embodiments, the field member 40 as an annular magnet is magnetized to cause the primary claw-shaped magnetic poles 22 to function as north poles and the secondary claw-shaped magnetic poles 32 to function as south poles. However, the magnetic poles of the annular field member 40 may be reversed and the annular field member 40 may cause the primary claw-shaped magnetic poles 22 to function as south poles and the secondary claw-shaped magnetic poles 32 to function as north poles.

In the fifth and sixth embodiments, one annular field member 40 is used as a field magnet. However, the annular field member 40 may be so configured that a plurality of divided parts of a permanent magnet are arranged around the rotary shaft 12 between the first core base 21 and the second core base 31 in the axial direction.

Although how to wind the winding on the teeth of the stator 6 is not particularly mentioned in the fifth and sixth embodiments, concentrated winding or distributed winding may be used.

The invention claimed is:

1. A rotor, comprising:
    a first rotor core including a substantially disk-shaped first core base and a plurality of primary claw-shaped magnetic poles formed at equal intervals on an outer peripheral part of the first core base, the primary claw-shaped magnetic poles protruding radially outward and extending in an axial direction;
    a second rotor core including a substantially disk-shaped second core base and a plurality of secondary claw-shaped magnetic poles formed at equal intervals on an outer peripheral part of the second core base, the secondary claw-shaped magnetic poles protruding radially outward and extending in the axial direction and each secondary claw-shaped magnetic pole being arranged between corresponding primary claw-shaped magnetic poles; and
    a field member arranged between the first core base and the second core base in the axial direction, wherein, when magnetized in the axial direction, the field member causes the primary claw-shaped magnetic poles to function as primary magnetic poles and the secondary claw-shaped magnetic poles to function as secondary magnetic poles; and
    auxiliary magnets each of which is arranged in one of a clearance formed by the back surface of one of the claw-shaped magnetic pole and a clearance between one of the primary claw-shaped magnetic poles and the corresponding one of the secondary claw-shaped magnetic poles in a circumferential direction,
    wherein at least the auxiliary magnets or the field member is formed integrally with at least one of the first rotor core and the second rotor core.

2. The rotor according to claim 1, wherein
    the auxiliary magnets include primary back magnets arranged in the clearances formed by the back surfaces of the primary claw-shaped magnetic poles and secondary back magnets arranged in the clearances formed by the back surfaces of the secondary claw-shaped magnetic poles,
    the primary back magnets are formed integrally with the first rotor core, and
    the secondary back magnets are formed integrally with the second rotor core.

3. The rotor according to claim 1, wherein the auxiliary magnets are formed integrally with each rotor core and the field member.

4. The rotor according to claim 1, wherein the rotor cores are formed by powder magnetic cores.

5. A motor comprising the rotor according to claim 1.

* * * * *